United States Patent [19]
Watanabe et al.

[11] Patent Number: 6,122,231
[45] Date of Patent: Sep. 19, 2000

[54] DISC RECORDING AND/OR REPRODUCING APPARATUS AND DISC PRESENCE DETECTING METHOD

[75] Inventors: Taro Watanabe, Chiba; Kenichi Nozaki, Tokyo, both of Japan

[73] Assignee: Sony Corporation, Tokyo, Japan

[21] Appl. No.: 09/166,107

[22] Filed: Oct. 2, 1998

Related U.S. Application Data

[62] Division of application No. 08/875,104, Jul. 22, 1997, Pat. No. 6,002,662.

[51] Int. Cl.$^7$ .............................. G11B 17/26; G11B 17/04
[52] U.S. Cl. .............................. 369/36; 369/179; 369/191
[58] Field of Search .................................. 369/33, 34, 35, 369/36, 38, 178, 179, 191, 192, 193, 194, 201, 202; 360/98.04, 98.05, 98.06, 92

[56] References Cited

U.S. PATENT DOCUMENTS

| | | | |
|---|---|---|---|
| 5,544,148 | 8/1996 | Nakamichi | 369/192 |
| 5,555,239 | 9/1996 | Takai et al. | 369/178 |
| 5,828,647 | 10/1998 | Lee et al. | 369/192 |
| 6,002,662 | 12/1999 | Watanabe et al. | 369/191 |

FOREIGN PATENT DOCUMENTS

| | | | |
|---|---|---|---|
| 4105016 | 8/1992 | Germany | 369/178 |
| 58-164059 | 9/1983 | Japan . | |
| 59-5457 | 1/1984 | Japan | 369/178 |
| 62-220459 | 9/1988 | Japan | 369/191 |
| 1-317265 | 12/1989 | Japan . | |
| 5-20764 | 1/1993 | Japan | 369/178 |
| 5-198074 | 8/1993 | Japan | 369/178 |
| 6-243570 | 9/1994 | Japan | 369/178 |
| 2200240 | 7/1988 | United Kingdom | 369/178 |

*Primary Examiner*—David L. Ometz
*Attorney, Agent, or Firm*—Jay H. Maioli

[57] ABSTRACT

A disc recording and/or reproducing apparatus provided with disc exchange function to carry out recording/reproduction while carrying out exchange between plural discs held within a disc holding body. This recording and, or reproducing apparatus comprises a disc holding body within which plural discs are held at predetermined intervals (spacings) in a stacked state, a biasing member for biasing respective discs held within the disc holding body in a direction projected from the disc holding body, a recording/reproduction unit for carrying out recording and/or reproduction of information signals with respect to the optical disc drawn out, and a carrying mechanism for taking out a predetermined one disc from the disc holding body to carry it to the recording/reproduction unit. This carrying mechanism includes a drawing mechanism, and allows this drawing mechanism to move at least the other one disc adjacent to a predetermined one disc held within the disc holding body toward the internal of the disc holding body against biasing force of the biasing member to draw out only the predetermined one disc in a direction projected from the disc holding body, thus to carry it.

2 Claims, 23 Drawing Sheets

DISC RECORDING AND/OR REPRODUCING APPARATUS AND DISC PRESENCE DETECTING METHOD

This is a division of prior application Ser. No. 08/875,104 filed Jul. 22, 1997. Now U.S. Pat. No. 6,002,662.

TECHNICAL FIELD

This invention relates to a disc recording and/or reproducing apparatus provided with a disc exchange function to take out an arbitrary one disc from plural discs held (accommodated) within a disc holding body and to carry the disc thus taken out to a recording and/or reproduction unit to carry out recording and/or reproduction of information signals, and a detecting method for detecting presence of a disc accommodated within the disc holding body.

BACKGROUND ART

Hitherto, there have been used disc recording and/or reproducing apparatuses provided with disc exchange function adapted for accommodating in advance plural discs such as optical disc, magneto-optical disc or magnetic disc, etc. on which information signals are to be recorded, or have been recorded to selectively take out an arbitrary one disc from these plural discs to carry the disc thus taken out to a recording and/or reproduction unit to allow it to undergo loading with respect thereto and thereby carry out recording and/or reproduction of information signals.

The disc recording/reproducing apparatus (hereinafter referred to as disc recording/reproduction unit as occasion may demand) of this kind comprises a disc accommodating body for accommodating plural discs therein, a drawing mechanism for selectively drawing out an arbitrary one disc from plural discs accommodated within the disc accommodating body, and a carry mechanism for carrying the disc drawn out by the drawing mechanism to the recording/reproduction unit.

The disc accommodating body provided in this disc recording/reproduction unit is constituted so as to accommodate plural discs with a predetermined interval (spacing) therebetween in such a manner that their principal surfaces are opposite to each other. Namely, the plural discs are accommodated within the disc accommodating body in such a manner that they are stacked with to each other in upper and lower directions.

In this case, in order to increase, without enlarging the disc recording/reproduction unit, the number of discs accommodated within this unit, it is required to improve accommodation efficiency of discs accommodated within the disc accommodating body.

In order to improve the accommodation efficiency of discs into the disc accommodating body, the intervals (spacings) between the respective disc accommodating portions for accommodating discs one by one, which are constituted within the disc accommodating body, are reduced, thereby making it possible to realize such improvement.

However, when the intervals between the disc accommodating portions are reduced, the intervals (spacings) between respective discs accommodated at the respective disc accommodating portions are reduced. For this reason, it would become impossible to draw out, by using the disc drawing mechanism, only a predetermined one disc from plural discs accommodated at the disc accommodating portions in such a manner that they are stacked.

Particularly, in the unit using a disc drawing mechanism adapted to grip or grasp a predetermined one disc from plural discs from a direction perpendicular to the principal surface and to draw the disc out, it becomes impossible to insert the gripping or grasping portion for gripping or grasping the disc into portions between discs stacked to each other. As a result, it becomes impossible to carry out drawing operation of the disc. In the disc drawing mechanism for gripping or grasping the disc from a direction perpendicular to the principal surface and for taking-out of the disc, it is necessary to open and close the gripping or grasping portion for the purpose of gripping or grasping the disc. In order to securely carry out drawing operation of a predetermined disc, gaps into which the gripping or grasping portion is inserted allowing it to open and close it are required between respective discs accommodated in such a manner that they are stacked to each other. As a result, it has become impossible to realize improvement in the accommodation efficiency of discs accommodated within the disc accommodating body.

In addition, when a portion of the disc drawing mechanism comes into contact with the signal recording surface of the disc in carrying out drawing operation of the disc, there is also the possibility that this signal recording surface may be damaged.

DISCLOSURE OF THE INVENTION

With the above in view, an object of this invention is to provide a disc recording and/or reproducing apparatus adapted to prevent enlargement of the apparatus itself so that improvement in the accommodation efficiency of discs can be realized.

Another object of this invention is to provide a disc recording and/or reproducing apparatus capable of securely taking out only a predetermined one disc from the disc holding body which holds plural discs therewithin.

A further object of this invention is to provide a disc recording and/or reproducing apparatus capable of realizing protection of discs held within the disc holding body and discs caused to undergo drawing operation from the disc holding body.

A still further object of this invention is to provide a disc recording and/or reproducing apparatus and a disc presence detecting method, which are capable of quickly or readily carrying out detection of presence of discs in a plurality of disc accommodating portions.

A further object of this invention is to provide a disc recording and/or reproducing apparatus and a disc presence detecting method in which the state of the plural disc accommodating portions is stored in advance to quickly or readily carry out drawing operation of the discs, and thus to have ability of quickly or readily recording and/or reproducing information signals with respect to plural discs.

A disc recording and/or reproducing apparatus according to this invention proposed for the purpose of realizing objects as described above comprises: a disc holding body within which plural discs are held in such a manner that their principal surfaces are opposite to each other and those discs are spaced with a predetermined interval (spacing) therebetween; a biasing member for biasing the respective discs held within the disc holding body in a direction projected from the disc holding body; a recording and/or reproduction unit for carrying out recording and/or reproduction of information signals with respect to the disc; and a carrying mechanism for taking out a predetermined one disc from the disc holding body to carry it to the recording and/or reproduction unit. This carrying mechanism includes a drawing mechanism for moving at least the other one disc adjacent to a predetermined one disc held within the disc holding body toward the inside of the disc holding body against biasing force of the biasing member to draw out the predetermined one disc in a direction projected from the disc holding body so as to grip or grasp it. In addition, the carrying mechanism carries a predetermined one disc to the recording and/or reproduction unit in the state where it is held by the drawing mechanism.

The drawing mechanism used in this case comprises a pressing operation portion for moving at least the other one disc adjacent to a predetermined one disc toward the inside of the holding body against biasing force of the biasing member, and a grip mechanism for gripping or grasping the predetermined one disc from a direction perpendicular to the principal surface of the disc in the state where at least the other one disc adjacent to the predetermined one disc is moved toward the inside of the holding body against biasing force of the biasing member by the pressing operation portion. This grip mechanism comprises a pair of grip arms and a switching portion for carrying out switching between a first state where these pair of grip arms grip or grasp the disc and a second state where the grip arms release the disc.

The disc recording and/or reproducing apparatus according to this invention further comprises a transfer mechanism moving between a position within the apparatus and a position outside the apparatus to transfer the disc, thus to allow the disc holding body to hold further discs by the transfer mechanism, or to take out the disc held within the disc holding body toward the outside of the disc holding body by the transfer mechanism.

Moreover, a disc recording and/or reproducing apparatus according to this invention comprises: a disc holding body within which plural discs are held in such a manner that their principal surfaces are opposite to each other and those discs are spaced with a predetermined interval (spacing) therebetween; a recording and/or reproduction unit for carrying out recording and/or reproduction of information signals with respect to the disc; and a carrying mechanism for taking out a predetermined one disc from the disc holding body to carry it to the recording and/or reproduction unit. This carrying mechanism includes a drawing mechanism for moving at least the other one disc adjacent to a predetermined one disc held within the disc holding body toward the inside of the disc holding body so as to draw out the predetermined one disc in a direction projected from the disc holding body to grip or grasp it. In addition, the carrying mechanism carries the predetermined one disc to the recording and/or reproduction unit in the state where it is held by the drawing mechanism.

Further, a disc recording and/or reproducing apparatus according to this invention comprises: a disc holding body within which plural discs are held in such a manner that their principal surfaces are opposite to each other and those discs are spaced with a predetermined interval (spacing) therebetween; a recording and/or reproduction unit for carrying out recording and/or reproduction of information signals with respect to the disc; a carrying mechanism for taking out a predetermined one disc from the disc holding body to carry it to the recording and/or reproduction unit; and a detection mechanism provided at the carrying mechanism and adapted for detecting presence of the disc within the disc holding body. In this case, the disc carrying mechanism includes a drawing mechanism for moving at least the other one disc adjacent to a predetermined one disc held within the disc holding body toward the inside of the disc holding body to draw out the predetermined one disc in a direction projected from the disc holding body, and thus to carry the predetermined one disc to the recording and/or reproduction unit in the state where it is held by the drawing mechanism.

Furthermore, a disc presence detecting method according to this invention comprises: the steps of moving, to a position where a disc is accommodated at a disc accommodating portion of a disc holding body, a drawing mechanism for moving, toward the inside of the disc holding body, at least the other one disc adjacent to a predetermined one disc held within the disc holding body in which plural disc accommodating portions adapted for accommodating plural discs in such a manner that their principal surfaces are opposite to each other and those discs are spaced with a predetermined interval (spacing) therebetween, and for drawing out the predetermined one disc in a direction projected from the disc accommodating portion of the disc holding body for holding the disc; thereafter detecting, by a detecting mechanism provided at the drawing mechanism and adapted for detecting presence of the disc within the disc holding body, whether or not the disc is accommodated at the disc accommodating portion of the disc holding body; and thereafter moving the drawing mechanism to any other disc accommodating portion adjacent to the disc accommodating portion in which detection as to whether or not the disc was accommodated has been made, so as to carry out, by the detecting mechanism, a detecting operation as to whether or not the disc is accommodated at the other disc accommodating portion and to repeatedly carry out such detecting operation for the other disc accommodating portions.

In addition, the result detected by the detecting mechanism is stored into the memory section in correspondence with each disc accommodating portion of the disc holding body.

Still further objects of this invention and more practical advantages or merits obtained by this invention will become more apparent from the description of the embodiments of which explanation will be given below.

BEST MODE FOR CARRYING OUT THE INVENTION

Explanation will be given by taking the example where this invention is applied to a disc recording/reproducing apparatus using an optical disc as a recording medium.

Figure 1:
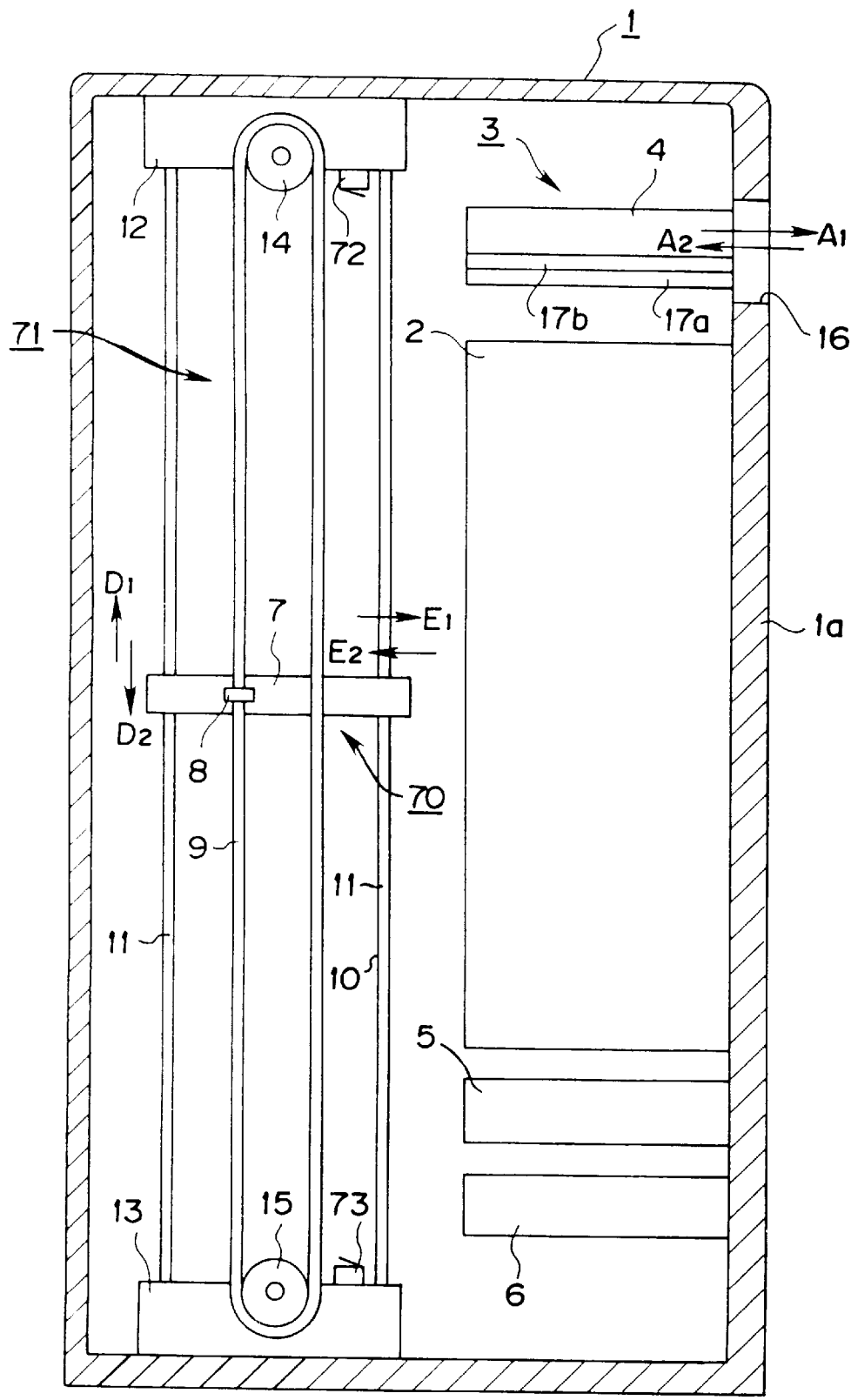
FIG. 1 is a side cross sectional view showing the outline of the configuration of a disc recording/reproducing apparatus according to this invention.
Figure 2:
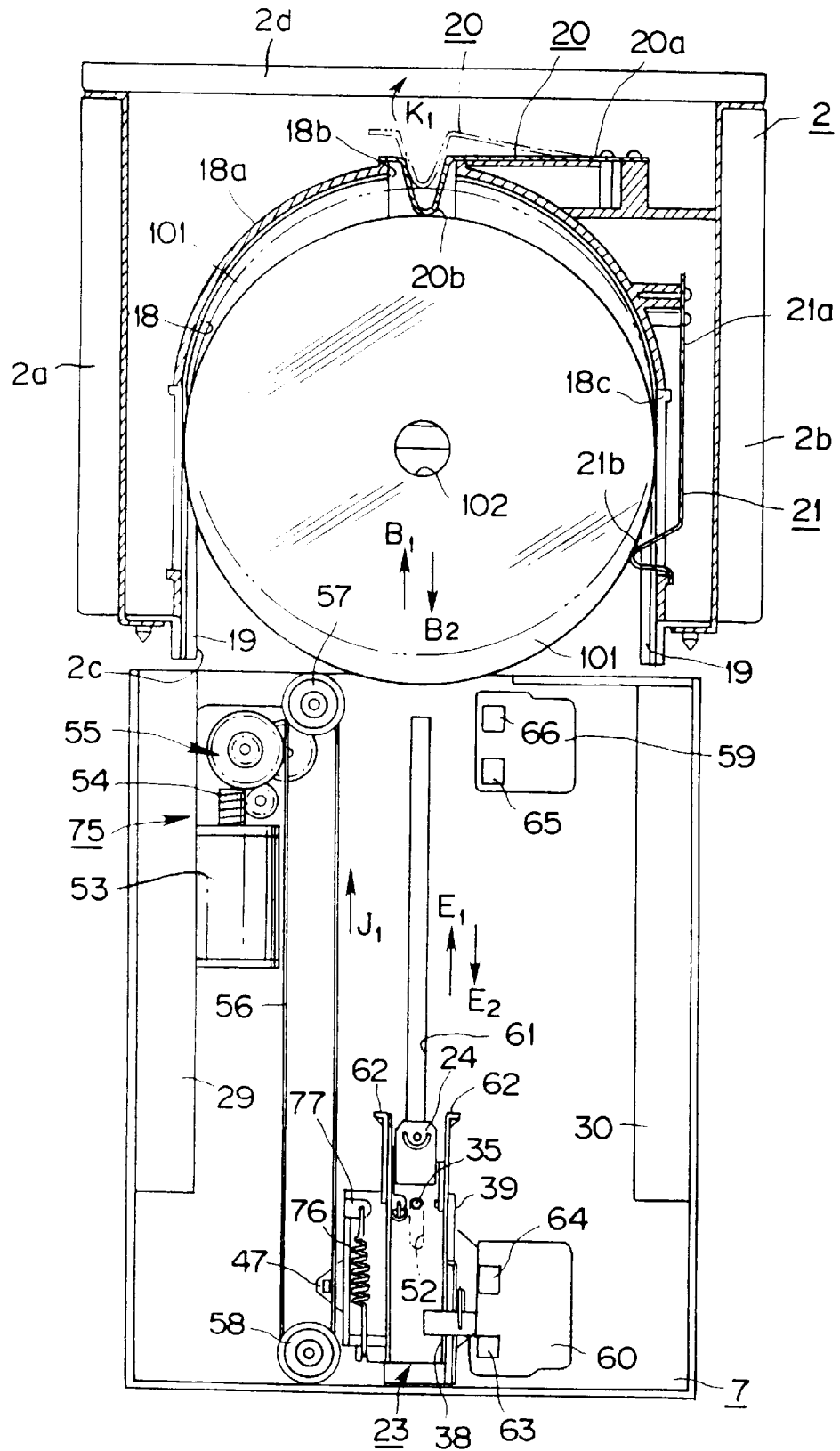
FIG. 2 is a plan view showing the arrangement relationship of disc accommodating body and disc carrying mechanism of the disc recording/reproducing apparatus according to this invention, wherein the state where disc drawing mechanism is moved to first position is shown.

The disc recording/reproducing apparatus (hereinafter referred to as disc recording/reproduction unit as occasion may demand) comprises an outer casing 1 constituting the unit body as shown in FIG. 1, and a disc accommodating body 2 constituting disc holding means for accommodating and holding plural optical discs 101, as shown in FIG. 2, is disposed within the outer casing 1.

The optical disc 101 used as the recording medium for this disc recording/reproduction unit is such that a signal recording layer is formed on a disc base (substrate) having rigidity formed by molding synthetic resin having light transmissivity such as polycarbonate resin. Since this optical disc 101 is formed by using a disc base having high rigidity as described above, it has a strength such that even if pressing operation is implemented from the direction perpendicular to the principal surface, it is not deformed. Moreover, as shown in FIG. 2, at the central portion of the optical disc 101, there is bored a center hole 102 engaged with a centering member provided at a disc table constituting the disc rotational drive mechanism when loaded with respect to the disc rotational drive mechanism of the recording/reproduction unit to carry out centering with respect to the disc table.

Figure 3:
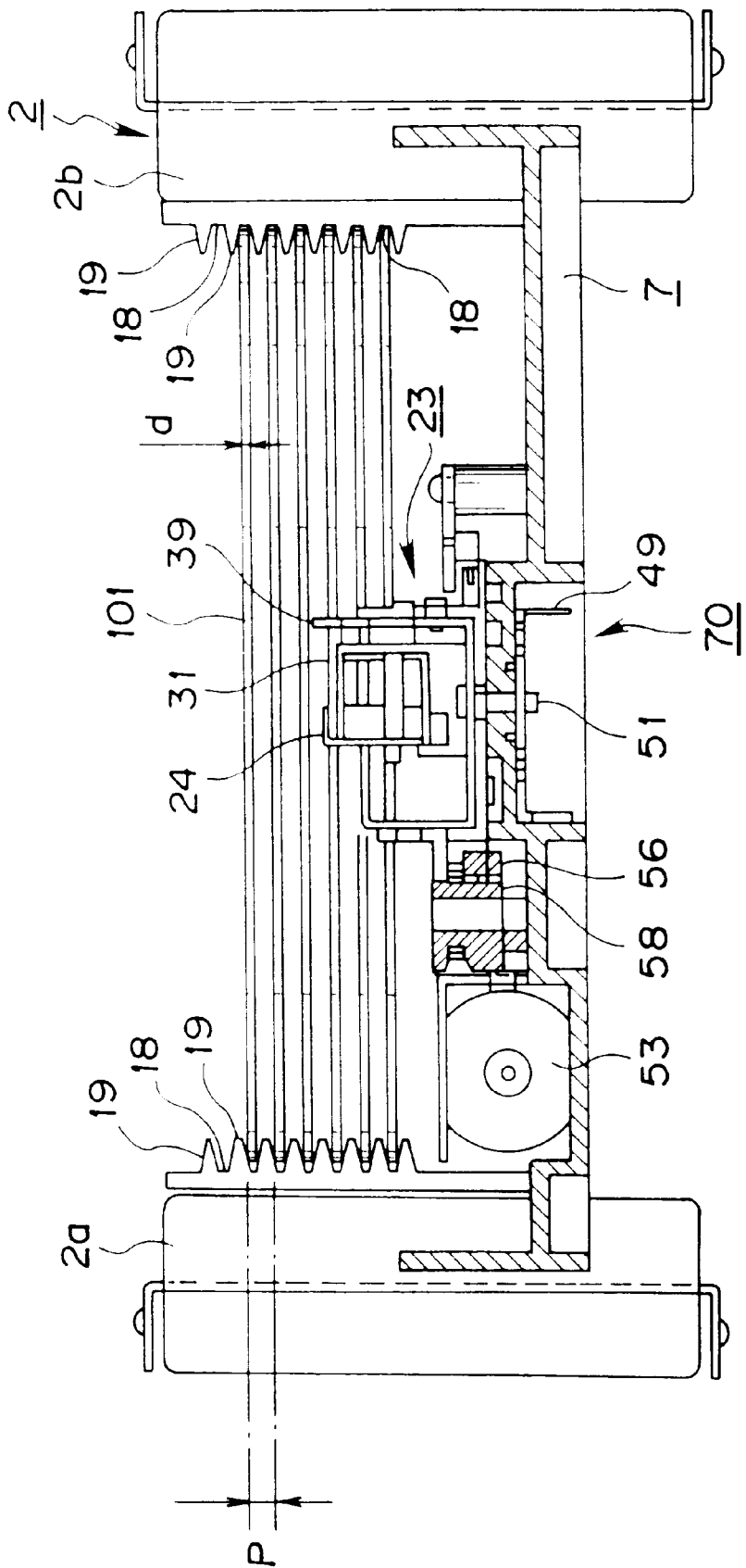
FIG. 3 is a partial front view showing the state where optical disc is caused to be held within the disc accommodating body and the disc carrying mechanism.

The disc accommodating body 2 for accommodating and holding plural optical discs 101 is provided in the state positioned substantially at the central portion in upper and lower directions of the front wall la side of the outer casing 1, as shown in FIG. 1. This disc accommodating body 2 is of a structure capable of holding plural optical discs 101 in such a manner that their principal surfaces are opposite to each other and those discs are spaced with a predetermined interval (spacing) therebetween. As shown in FIG. 2, the disc accommodating body 2 is formed so as to have a size (dimensions) such that it can accommodate and hold the optical discs 101 in a horizontal state, wherein plural supporting projected pieces 19 for supporting the outer circumferential edges of the optical discs 101 are provided in a projected manner (hereinafter simply referred to as projected as occasion may demand) in the state opposite to each other at the inside surfaces of both side walls 2a, 2b that are positioned opposite to each other. As shown in FIG. 3, these supporting projected pieces 19 are formed at equal intervals (distances) in a multi-step form in a height direction of the side walls 2a, 2b of the disc accommodating body 2, and disc supporting portions 18 are constituted by respective pairs of supporting projected pieces 19 projected at the same height on the left and right side walls 2a, 2b, respectively.

Further, the supporting projected pieces 19 formed in the multi-step form in the height direction of the disc accommodating body 2 are adapted so that when the disc accommodating body 2 is assumed to be constituted as an accommodating body for accommodating optical disc 101 having thickness d caused to be 1.2 mm, the supporting projected pieces 19 are formed at pitch P of about 2.5 mm.

Further, as shown in FIGS. 1 and 3, the disc recording/reproduction unit according to this invention comprises a disc carrying mechanism 70 provided with a disc drawing mechanism 23 for drawing out and carrying the optical disc 101 accommodated and held within the disc accommodating body 2 in a manner opposite to the opened front side of the disc accommodating body 2.

Further, the disc recording/reproduction unit is adapted so that first and second recording/reproduction units 5, 6 for carrying out recording and/or reproduction of information signals with respect to the optical disc 101 drawn out from the disc accommodating body 2 and carried by the disc carrying mechanism 70 are disposed in a manner positioned at the lower side of the disc accommodating body 2. As shown in FIG. 1, these first and second recording/ reproduction units 5, 6 are disposed at the lower step side of the disc accommodating body 2 in such a manner that they are stacked to each other. Since the first and second recording/reproduction units 5, 6 serve to carry out recording and/or reproduction of information signals with respect to the optical disc 101 carried by the disc carrying mechanism 70, they each comprise a disc rotational drive mechanism for rotationally operating the optical disc 101 carried by the disc carrying mechanism 70, and mechanisms required for carrying out recording and/or reproduction of information signals such as optical pick-up device or magnetic head device, etc. for carrying out recording and/or reproduction of information signals with respect to the optical disc 101 rotationally operated by the disc rotational drive mechanism.

Figure 4:
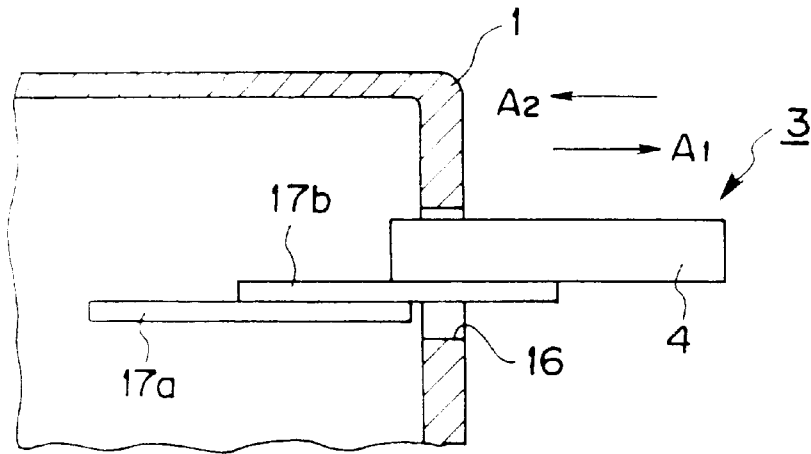
FIG. 4 is a side view showing the state where disc tray of disc exchange mechanism is caused to be projected toward the outside of outer casing.

Furthermore, at the upper side of the disc accommodating body 2, there is provided a disc exchange mechanism 3 for carrying out exchange between optical discs 101 accommodated within the disc accommodating body 2. This disc exchange mechanism 3 comprises a disc tray 4 adapted so that optical disc 101 drawn out and carried from the disc accommodating body 2 by the disc carrying mechanism 70 is mounted, or optical disc 101 to be accommodated within the disc accommodating body 2 is mounted. In this disc tray 4, movement operation in the direction indicated by arrow $A_1$ or in the direction indicated by arrow $A_2$ in FIGS. 1 and 4 is carried out extending over inside and outside of the outer casing 1 of the disc tray 4 as shown in FIG. 4 within the range between a first position where it is accommodated within the outer casing 1 shown in FIG. 1 and a second position where it is projected toward the outside of the outer casing 1 shown in FIG. 4 through an insertion/withdrawal hole 16 provided at the front wall la of the outer casing 1 and is carried out by the tray movement operation mechanism provided with drive motor (not shown). Namely, when the tray movement operation mechanism is driven, the disc tray 4 is caused to undergo movement operation in the direction indicated by arrow $A_1$ or in the direction indicated by arrow $A_2$ in FIGS. 1 and 4 while being guided by a fixed guide rail 17a and a movement guide rail 17b caused to undergo relative movement with respect to the fixed guide rail 17a.

The disc exchange mechanism 3 is adapted so that in the state where the optical disc 101 is drawn out and carried from the disc accommodating body 2 by the disc carrying mechanism 70 and is mounted on the disc tray 4, it moves the disc tray 4 in the direction indicated by arrow $A_1$ in FIGS. 1 and 4 to the second position projected toward the outside of the outer casing 1, and there results the state where the optical disc 101 mounted on the disc tray 4 can be exchanged. When a new optical disc 101 is mounted on the disc tray 4 moved to the second position to draw the disc tray 4 into the outer casing 1 to move it to the fist position, the disc carrying mechanism 70 draws out, from on the disc tray 4, the optical disc 101 mounted on the disc tray 4 to carry it and insert it into a predetermined disc supporting portion 18 of the disc accommodating body 2 to allow the disc supporting portion to hold the disc. By such an operation, exchange of the optical disc 101 accommodated and held within the disc accommodating body 2 is carried out through the disc exchange mechanism 3.

Meanwhile, at the disc accommodating body 2, as shown in FIG. 2, there are provided disc pressing springs 20 for biasing the optical discs 101 supported by the respective disc supporting portions 18 in a direction projected from the disc accommodating body 2. These disc pressing springs 20 are provided in the state positioned at the back side opposite to the opened opening portion 2c side where insertion/ withdrawal of the optical disc 101 is carried out with respect to the disc accommodating body 2. Each disc pressing spring 20 is formed by leaf spring, and is attached in the state where the base end portion 20a side is fixed to the outside surface side of a peripheral wall 18a surrounding the disc supporting portion 18 positioned at the back face wall 2d side of the disc accommodating body 2, and a curved projected portion 20b at front end side thereof is projected into the disc accommodating body 2 through a cut hole 18b provided substantially at the central portion of the peripheral wall 18a. Accordingly, the optical disc 101 is accommodated within the disc accommodating body 2 in such a manner that the insertion end of the optical adisc 101 into the disc accommodating body 2 is caused to be in contact with the disc pressing spring 20. Moreover, the optical disc 101 accommodated within the disc accommodating body 2 is pushed or pressed in the direction indicated by arrow $B_1$ in FIG. 2 which is the direction of insertion into the disc accommodating body 2, whereby it is further moved toward the inside of the disc accommodating body 2 in such a manner that the disc pressing spring 20 is caused to undergo elastic displacement as indicated by broken lines in FIG. 2. When the pressing (pushing) operation is released, the optical disc 101 experiences biasing force of the disc pressing spring 20 which has been caused to undergo pressing displacement. Thus, this optical disc 101 is pressed in the direction indicated by arrow $B_2$ in FIG. 2 which is the direction projected away from the disc accommodating body 2 which is toward the opening portion 2c side of the disc accommodating body 2.

The disc supporting springs 20 for pressing and supporting the optical discs 101 accommodated within the disc accommodating body 2 are provided at respective disc supporting portions 18 in a manner respectively corresponding thereto so as to have ability of respectively independently pressing the optical discs 101 supported by the disc supporting portions 18.

Moreover, at the side wall 2b side perpendicular to a back face wall 2d of the disc accommodating body 2, as shown in FIG. 2, there is provided a disc supporting spring 21 for preventing the optical disc 101 accommodated within the disc accommodating body 2 from inadvertently slipping off from the opening portion 2c side. This disc supporting spring 21 is also formed by leaf spring, and is attached in the state where the base end portion 21a is fixed to the outside surface of the peripheral wall 18a positioned at the side wall 2b side of the disc accommodating body 2, and a curved projected portion 21b at the front end side thereof is projected into the disc accommodating body 2 through a cut portion 18c provided at the peripheral wall 18a.

Further, the optical disc 101 is adapted so that when it is accommodated within the disc accommodating body 2, the outer circumferential edge positioned at the opening portion 2c side of the disc accommodating body 2 from the center hole 102 is pressed and supported by the projected portion 21b at the front end side of the disc supporting spring 21. At this time, the disc pressing spring 21 is placed in the state where it is slightly pressed by the optical disc 101. Accordingly, the optical disc 101 is accommodated and held within the disc accommodating body 2 in the state where it is pressed and biased in the direction indicated by arrow $B_1$ in FIG. 2 toward the inside of the disc accommodating body 2 by the disc supporting spring 21, and is pressed and biased in the direction indicated by arrow $B_2$ in FIG. 2 which is the direction projected away from the disc accommodating body 2 which is the direction opposite to the above by the disc pressing spring 20. Thus, the optical disc 101 is held in a stable state at a fixed position within the disc accommodating body 2 so that inadvertent slipping off from the disc accommodating body 2 is prevented.

Figure 5:
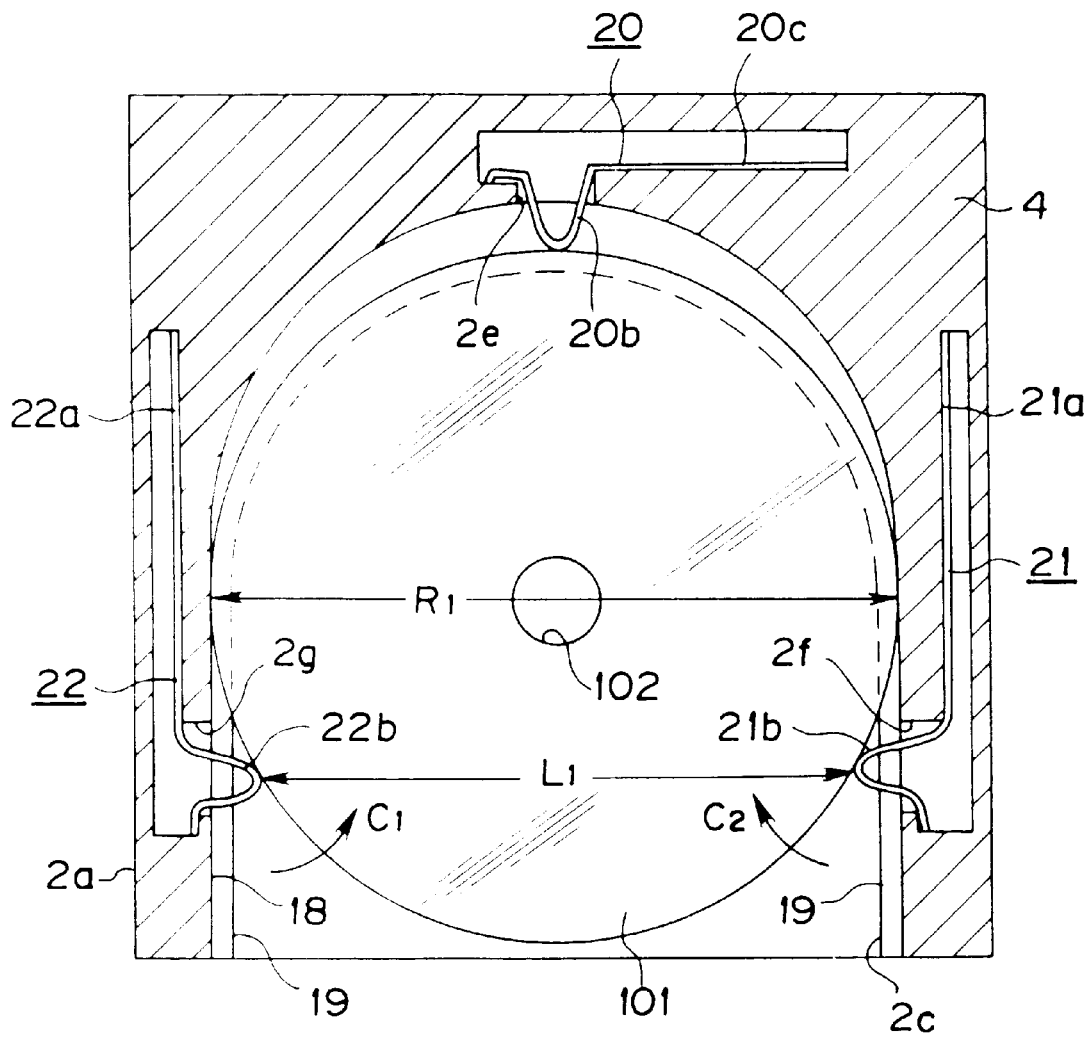
FIG. 5 is a plan view showing another example of the disc accommodating body.

While the disc supporting spring 21 is disposed only at the side wall 2b side of the disc accommodating body 2 in the above-described example, it may be disposed also at the other side wall 2a side as shown in FIG. 5.

A disc supporting spring 22 disposed at the other side wall 2a side is also formed by leaf spring, and is attached in the state where the base end portion 22a is fixed at the outside surface of the peripheral wall 18a positioned at the side wall 2a of the disc accommodating body 2, and a curved projected portion 22b at the front end side thereof is projected into the disc accommodating body 2 through a cut hole 2g provided at the side wall 2a. Further, this disc supporting spring 22 is also attached on the outside surface of the peripheral wall 181a positioned at the side wall 2a of the disc accommodating body 2 in such a manner that the projected portion 22b of the front end portion side supports the outer circumferential edge positioned at the opening portion 2c side of the disc accommodating body 2 from the center hole 102 of the optical disc 101 accommodated within the disc accommodating body 2.

By respectively providing the disc supporting springs 21, 22 at the both side walls 2a, 2b opposite to each other of the disc accommodating body 2, the optical disc 101 accommodated within the disc accommodating body 2 is pressed and biased in the direction indicated by arrow $C_1$ and in the direction indicated by arrow $C_2$ in FIG. 5 toward the inside of the disc accommodating body 2 in the state pressed and supported by the disc supporting springs 21, 22 from the both sides.

It is to be noted that the interval (spacing) $L_1$ between the respective projections 21b, 22b of the pair of disc supporting springs 21, 22, respectively, is caused to be a value narrower than the diameter $R_1$ of the optical disc 101. Accordingly, when the optical disc 101 is accommodated into the disc accommodating unit 2, the respective disc supporting springs 21, 22 are pressed by the optical disc 101 and are caused to undergo elastic displacement in a direction opposite to the direction indicated by arrow $C_1$ and in a direction opposite to the direction indicated by arrow $C_2$ in FIG. 5.

Also in the example shown in FIG. 5, the optical disc 101 to be accommodated into the disc accommodating body 2 is accommodated and held within the disc accommodating body 2 in the state where it is pressed and biased toward the inside of the disc accommodating body 2 by the respective disc supporting springs 21, 22, and is pressed and biased in a direction projected away from the disc accommodating body 2 which is the opposite direction to that caused by the respective disc supporting springs 21, 22 by the disc pressing spring 20. Thus, the optical disc 101 is held in the stable state at a fixed position within the disc accommodating body 2. As a result, inadvertent slipping off from the disc accommodating body 2 is prevented.

While the disc pressing spring 20 and the disc supporting springs 21, 22 are attached through the disc accommodating body 2 in the above-described embodiment, they may be disposed at the outer casing 1 side.

Further, the disc carrying mechanism 70 adapted for selectively drawing out optical disc 101 accommodated within the disc accommodating body 2 so as to carry it to the first or second recording/reproduction units 5, 6, or for drawing out optical disc 101 loaded with respect to the first or second recording/reproduction units 5, 6 so as to carry it to a predetermined disc supporting portion 18 of the disc accommodating body 2 is disposed in a manner opposite to the opened front side of the disc accommodating body 2.

This disc carrying mechanism 70 comprises, as shown in FIG. 1, a disc carrying body 7 that is caused to undergo vertical movement operation in upper and lower directions extending across the disc exchange mechanism 3 disposed at the upper side of the disc accommodating body 2 and the second recording/reproduction unit 6 disposed at the lowermost side of the disc accommodating body 2, i.e., in the direction indicated by arrow $D_1$ and in the direction indicated by arrow $D_2$ in FIG. 1. This disc carrying body 7 is supported by a pair of supporting shafts 10, 11 disposed in parallel to the height direction perpendicular to the principal surface of the optical disc 101 accommodated within the disc accommodating body 2. The disc carrying body 7 is disposed in a manner opposite to the opening portion 2c of the disc accommodating body 2 so that it can be moved in vertical movement direction (in upper and lower directions) of the direction indicated by arrow $D_1$ and the direction indicated by arrow $D_2$ in FIG. 1. The support shafts 10, 11 for supporting the disc carrying body 7 are supported between a first supporting base 12 disposed at the upper side within the outer casing 1 and a second supporting base 13 disposed at the lower side within the outer casing 1.

The disc carrying body 7 is caused to undergo vertical movement operation, by a vertical movement operation mechanism 71, extending across the disc exchange mechanism 3 of the upper side and the second recording/reproduction unit 6 of the lowermost side while being guided by the first and second support shafts 10, 11. This vertical movement operation mechanism 71 comprises a timing belt 9 in an endless form in which the middle portion is fixed to the disc carrying body 7 through a fixing member (appliance) 8, and a pair of first and second feed gears 14, 15 on which the timing belt 9 is wound. The first feed gear 14 is rotatably attached on the first supporting base 12, and the second feed gear 15 is rotatably attached on the second supporting base 13. Further, the second feed gear 15 positioned at the lower side is connected to, e.g., drive motor disposed at the second supporting base 13 side although not shown. When the drive motor is driven and the second feed gear 15 is rotationally operated so that the timing belt 9 turns around the first and second feed gears 14, 15, the disc carrying body 7 is caused to undergo movement operation in the vertical direction indicated by arrow $D_1$ and the direction indicated by arrow $D_2$ in FIG. 1.

Moreover, at the surface side opposite to the disc carrying body 7 of the first supporting base 12, there is provided an upper (upward) position detecting switch 72 for detecting that it is caused to undergo pressing operation by the disc carrying body 7 when the disc carrying body 7 has been moved to the upper (upward) position. Further, at the surface side opposite to the disc carrying body 7 of the second supporting base 13, there is provided a lower (downward) position detecting switch 73 for detecting that i s caused to undergo pressing operation by the disc carrying body 7 when the disc carrying body 7 has been moved to the lower (downward) position.

Further, at the disc carrying body 7, as shown in FIG. 2, there is provided a disc drawing mechanism 23 for carrying out delivery/receipt (transfer) of the optical disc 101 between the disc carrying body 7 and the disc accommodating body 2, between the disc carrying body 7 and the disc exchange mechanism 3, and between the disc carrying body 7 and the first and second recording/reproduction units 5, 6. This disc drawing mechanism 23 is moved in the direction indicated by arrow $E_1$ and in the direction indicated by arrow $E_2$ in FIG. 2 which are the directions in parallel to the principal surface of the optical disc 101 accommodated within the disc accommodating body 2 to thereby grip or grasp the optical disc 101 accommodated within the disc accommodating body 2 so as to draw out, and to accommodate the optical disc 101 thus drawn out into the disc accommodating unit 2.

The disc drawing mechanism 23 is adapted so that when it is located at the position opposite to the disc accommodating body 2, it carries out delivery/receipt (transfer) of the optical disc 101 between the disc accommodating body 2 and the disc carrying body 7. When the disc drawing mechanism 23 is located at the position opposite to the disc exchange mechanism 3, it carries out delivery/receipt (transfer) of the optical disc 101 between the disc exchange mechanism 3 and the disc carrying body 7, and when it is located at the position opposite to the first or second recording/reproduction unit 5, 6, it carries out delivery/receipt (transfer) of the optical disc 101 between the first or second recording/reproduction unit 5, 6 and the disc carrying body 7.

Figure 6:
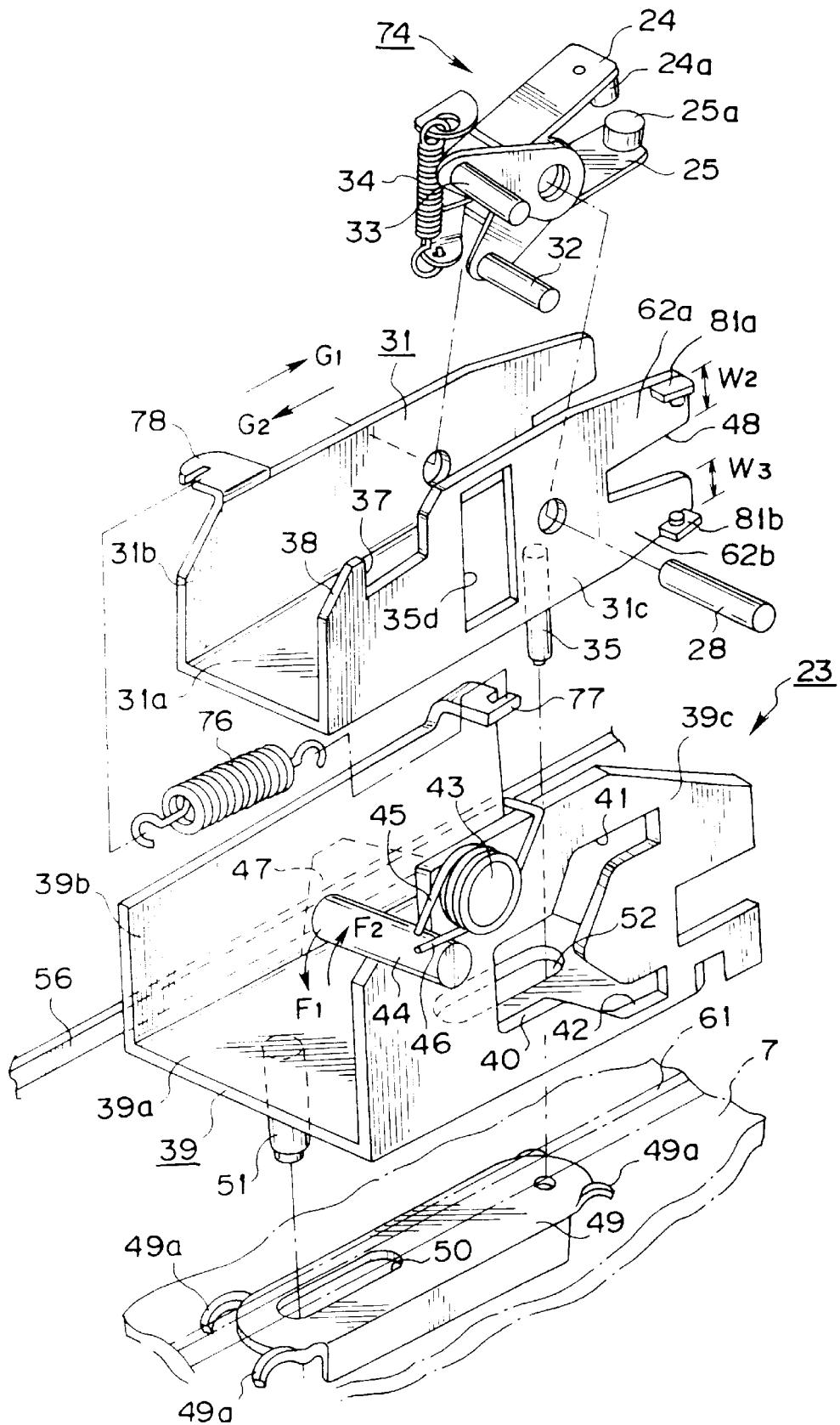
FIG. 6 is an exploded perspective view showing the disc drawing mechanism.
Figure 7:
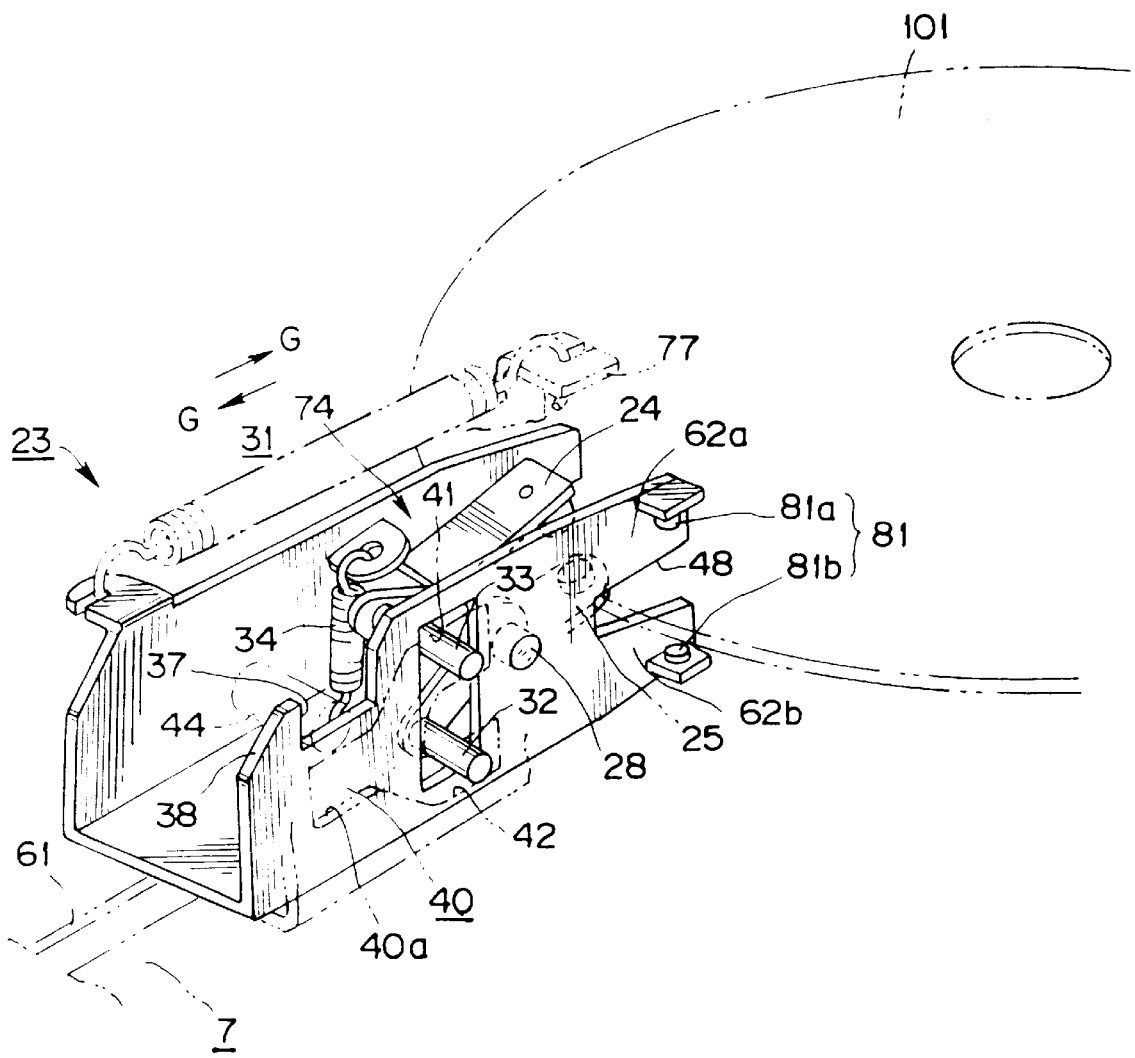
FIG. 7 is a perspective view showing the disc drawing mechanism.

Further, the disc drawing mechanism 23 disposed on the disc carrying body 7 comprises, as shown in FIGS. 6 and 7, a disc grip mechanism 74 for gripping or grasping the optical disc 101, a grip mechanism supporting member 31 to which the grip mechanism 74 is attached, and a movement member 39 adapted and the grip mechanism supporting member 31 is supported so that it can be relatively moved.

Figure 8:
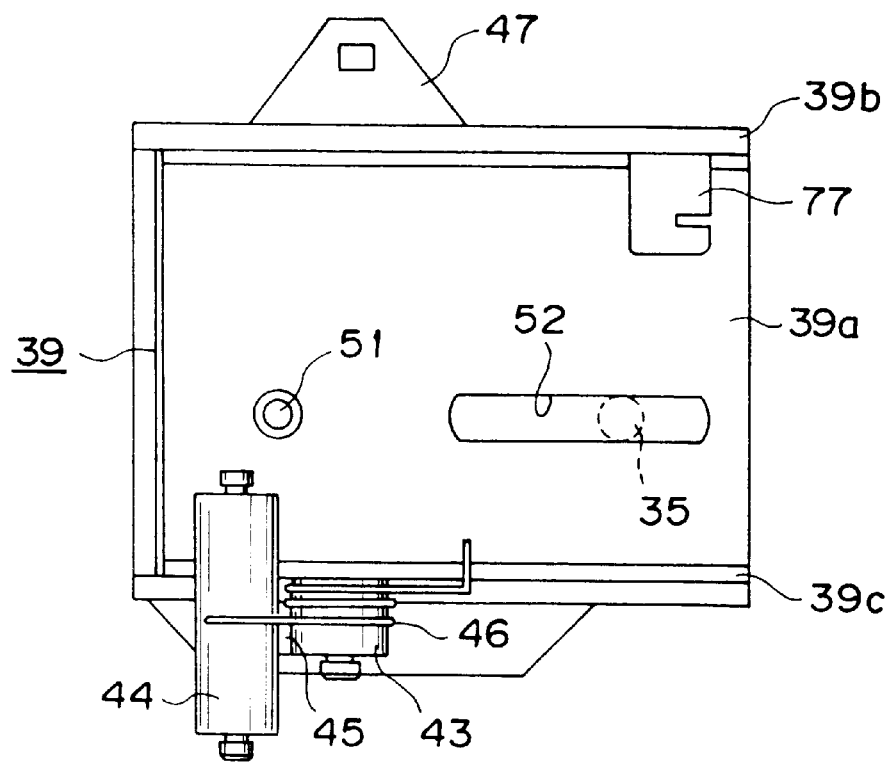
FIG. 8 is a plan view showing movement member constituting the disc drawing mechanism.
Figure 9:
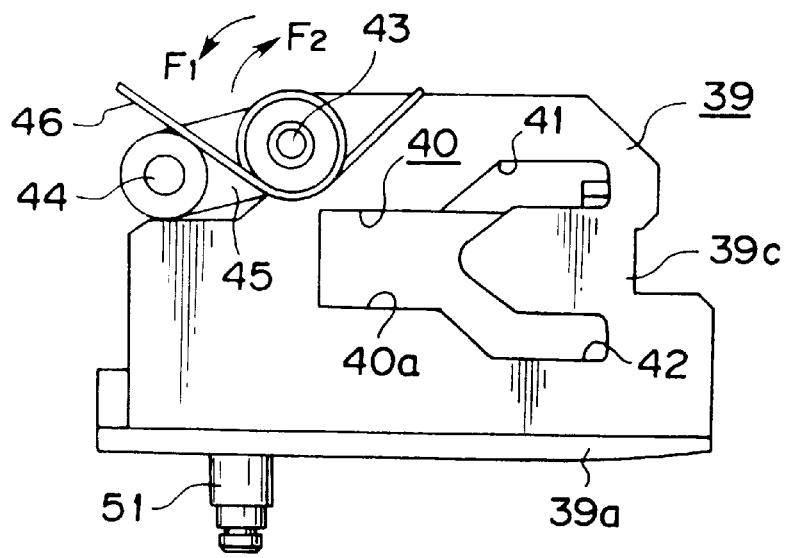
FIG. 9 is a side view of the movement member.

As shown in FIG. 6, the movement member 39 by which the grip mechanism supporting member 31 is supported is formed in a rising manner (hereinafter simply referred to as rising-formed as occasion may demand) and in such a manner that side plates 39b, 39c are opposite to each other on the both sides of a bottom plate 39a, and is formed so as to take substantially channel shape. At the side of the outside surface of one side plate 39b, as shown in FIG. 8, there is projected toward the outside, a belt connection portion 47 to which the middle portion of a timing belt 56, in an endless form constituting movement operation mechanism 75 for allowing the movement member 39 to undergo movement operation, is connected. On the lower surface of the bottom plate 39a of the movement member 39, as shown in FIGS. 6 and 9, a movement guide shaft 51 is attached in a manner in which the movement guide shaft 51 hangs down. The movement member 39 is disposed on the disc carrying body 7 in the state where the movement guide shaft 51 is inserted through a movement guide groove 61 bored through the disc carrying body 7.

Meanwhile, as shown in FIG. 2, the movement guide groove 61 through which the movement guide shaft 51 is inserted is bored extending over substantially the entire length of the disc carrying body 7 in parallel to the direction in which the optical disc 101 is caused to undergo insertion/withdrawal with respect to the disc accommodating body 2. Further, the movement member 39 is disposed on the disc carrying body 7 in the state where the movement guide shaft 51 is inserted through the movement guide groove 61, and is moved in the direction indicated by arrow $E_1$ or In the direction indicated by arrow $E_2$ in FIG. 2 while being guided by the movement guide groove 61.

Moreover, at the other side plate 39c of the movement member 39, as shown in FIGS. 6, 7 and 9, there is bored a cam groove 40 adapted so that the grip mechanism supporting member 31 disposed on the movement member 39 is relatively moved with respect to the movement member 39, whereby the cam groove 40 allows the disc grip mechanism 74 to undergo opening/closing operation. This cam groove 40 is composed of a broad horizontal groove portion 40a, and first and second inclined groove portions 41, 42, respectively, inclined in a manner branched from the horizontal groove portion 40a and spaced away from each other. Further, at the upper end side of the other side plate 39c, as described later, there is attached an engagement lever 45 that is engaged with an engagement recessed portion 37 provided at the grip mechanism supporting member 31, and adapted for limiting relative movement with respect to the movement member 39 of the grip mechanism supporting member 31. This engagement lever 45 is rotatably attached in the direction indicated by arrow $F_1$ and in the direction indicated by arrow $F_2$ in FIGS. 6 and 9. The directions indicated by arrows $F_1$ and $F_2$ are the directions perpendicular to the movement direction of the movement member 39 with the support shaft 43 acting as the center in the state where the base end portion side is pivotally supported on a support shaft 43 projected on the side of the outside surface of the other side plate 39c. At the front end side of the engagement lever 45, there is attached an engagement pin 44 in a cylindrical form which is engaged with the engagement recessed portion 37. This engagement pin 44 is attached in a manner perpendicular to the rotational direction of the engagement lever 45. In addition, the engagement lever 45 is rotationally biased in the direction indicated by arrow $F_1$ in FIGS. 6 and 9 by a torsion coil spring 46 attached in such a manner that one arm portion is held by the other side plate 39c and the other arm portion is held by the engagement pin 44.

Figure 10:
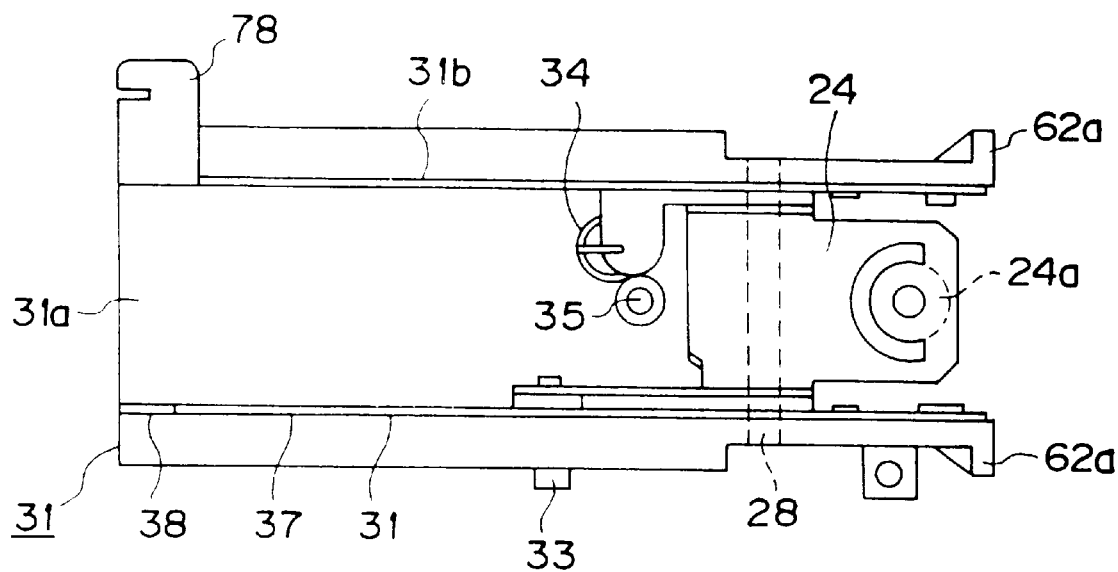
FIG. 10 is a plan view showing grip mechanism supporting member constituting the disc drawing mechanism.
Figure 11:
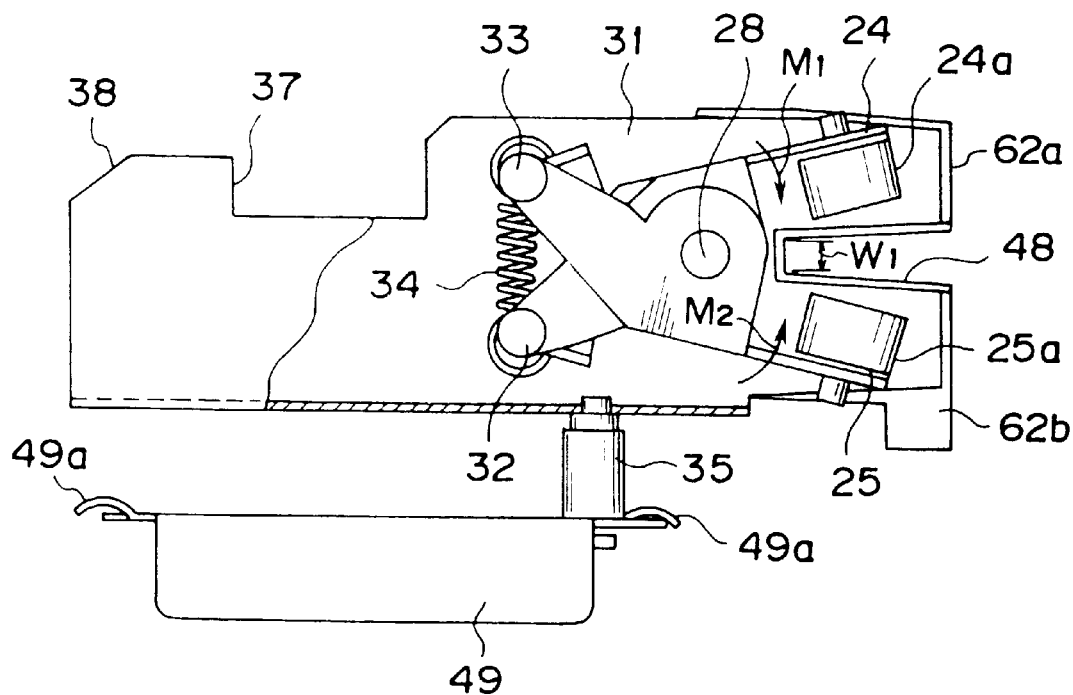
FIG. 11 is a side view of the grip mechanism supporting member.

Further, as shown in FIGS. 6, 10 and 11, the grip mechanism supporting member 31 supported on the movement member 39 is formed so as to take a channel shape in cross section in the state where side plates 31b, 31c are extending upwards and formed in a manner opposite to each other on the both sides of a bottom plate 31a similarly to the side plates 39b, 39c of movement member 39. As shown in FIGS. 6 and 7, this grip mechanism supporting member 31 is disposed on the bottom plate 39a of the movement member 39 in such a manner that it is fitted between the side plates 39b, 39c of the movement member 39. At the lower surface side of the bottom plate 39a of the grip mechanism supporting member 39, there is attached, in a manner hanging down, an operation shaft 35 inserted into an elongated hole 52 bored through the bottom plate 39a of the movement member 39 and the movement guide groove 61 bored through the disc carrying body 7. The grip mechanism supporting member 31 disposed on the movement member 39 in the state where the operation shaft 35 is inserted into the elongated hole 52 is relatively moved with respect to the movement member 39 within the range of the elongated hole 52.

Between the grip mechanism supporting member 31 supported on the movement member 39 and the movement member 3D, an extension (tensile) spring 76 is stretched. As shown in FIGS. 6 and 7, this extension spring 76 is stretched between a spring holding piece 77 formed in a manner in which the spring holding piece 77 is turned back toward the internal side at one end of the upper edge side of one side plate 39b of the movement member 39 and a spring holding piece 78 formed in a manner in which the spring holding piece 78 is turned back toward the outside at the other end of the upper edge side of one side plate 31b of the grip mechanism supporting member 31. As the result of the fact that the extension spring 76 is stretched in this way, the grip mechanism supporting member 31 is supported by the movement member 39 in the state causing the grip holding supporting member 31 to undergo biasing so that it can be moved in the direction indicated by arrow $G_1$ in FIG. 6 which is the direction projected from the movement member 39.

Further, at the front end sides of the side plates 31b, 31c of the grip mechanism supporting member 31, i.e., in a manner positioned substantially at the central portion of the front end side opposite to the disc accommodating body 2 when the grip mechanism supporting member 31 is disposed on the disc carrying body 7 as shown in FIG. 2, there is formed as shown in FIGS. 6 and 11 an engagement recessed portion 48 with which the outer circumferential portion of a predetermined one optical disc 101 accommodated within the disc accommodating body 2 is engaged. This engagement recessed portion 48 is formed so that its width gradually becomes broader from the internal side toward the opening end side, and is formed in such a manner that the internal end side thereof has a width $W_1$ substantially equal to the thickness d of the optical disc 101. Moreover, at upper and lower portions of the engagement recessed portion 48 of the front end sides of the side plates 31b, 31c, there are formed a first disc pressing portion 62a and a second disc pressing portion 62b for allowing the optical disc 101 accommodated within the disc accommodating body 2 to undergo pressing operation against biasing force of the disc pressing spring 20. These first and second disc pressing portions 62a, 62b are adapted so that when the grip mechanism supporting member 31 disposed on the disc carrying body 7 is moved on the disc carrying body 7, and is admitted into the disc accommodating body 2 through the opening portion 2c, the first and second disc pressing portions 62a, 62b press at least one the other optical disc 101 positioned in a manner adjacent to and in upper and lower directions of the optical disc 101 gripped or grasped by the grip mechanism 74 in the direction indicated by arrow $B_1$ in FIGS. 2 and 11 which is toward the inside of the disc accommodating body 2 against biasing force of the disc pressing spring 20 to relatively project a predetermined one optical disc 101 positioned between other optical discs 101 with respect to the other optical disc or discs 101 thus to engage a portion of the outer circumferential edge side of the predetermined optical disc 101 into the engagement recessed portion 48.

Figure 12:
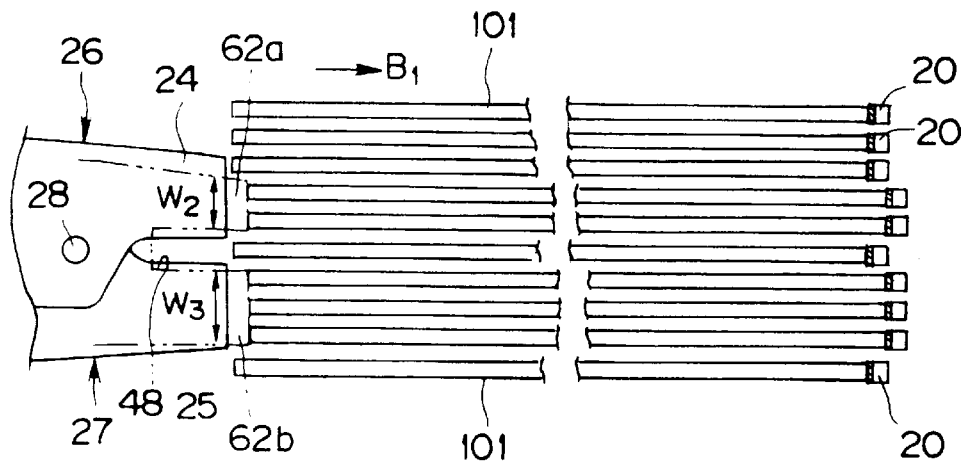
FIG. 12 is a side view showing the state where the optical disc held within the disc accommodating body is caused to undergo pressing operation by disc pressing portion.

In this embodiment, as shown in FIG. 12, the first disc pressing portion 62a positioned at the upper side is formed so as to have a width $W_2$ sufficient to press two other optical discs 101 positioned in a manner adjacent to the upper side of the optical disc 101 gripped or grasped by the disc grip mechanism 74, and the second disc pressing portion 62b positioned at the lower side is formed so as to have a width $W_3$ sufficient to press three other optical discs 101 positioned in a manner adjacent to the lower side of the optical disc 101 gripped or grasped by the disc grip mechanism 74.

Moreover, at the side of the outside surface of the other side plate 31c of the grip mechanism supporting member 31, there is provided a disc detection sensor 81 for detecting presence of insertion of the optical disc 101 into the engagement recessed portion 48. As shown in FIGS. 6 and 7, this disc detection sensor 81 is of a structure in which a light emitting element 81a and a light receiving element 81b are arranged oppositely to each other in such a manner that the engagement recessed portion 48 is put therebetween. The disc detection sensor 81 serves to detect presence of light from the light emitting element 81a by the light receiving element 81b to thereby detect whether or not the optical disc 101 is inserted into the engagement recessed portion 48.

At the grip mechanism supporting member 31, the grip mechanism 74 is attached through the side plates 31b, 31c.

As shown in FIGS. 6 and 11, the disc grip mechanism 74 comprises a pair of grip arms 24, 25. These grip arms 24, 25 are attached so that their middle portions are pivotally supported by a support shaft 28 inserted between the pair of side plates 31b, 31c, the pair of grip arms 24, 25 can be rotated with the support shaft 28 acting as the center. At the front end side of the grip arms 24, 25, disc holding pads 24a, 25a are attached in a manner opposite to each other. These disc holding pads 24a, 2a are formed by synthetic resin body having elasticity or felt, etc. in order that the optical disc 101 is not damaged when the optical disc 101 is held by the disc holding pads 24a, 25a therebetween.

In this example, the pair of grip arms 24, 25 are adapted so that when they are disposed on the disc carrying body 7, they are attached to the grip mechanism supporting member 31 in such a manner that the front end sides where the disc holding pads 24a, 25a are attached are opposed to the disc accommodating body 2.

Further, these pair of grip arms 24, 25 are caused to undergo rotational operation with the support shaft 28 acting as the center to thereby allow the disc holding pads 24a, 25a at the front end portion side thereof to be in contact with the optical disc 101 or to be away therefrom so as to grip or grasp the optical disc 101, or release of the optical disc 101. Moreover, an extension spring 34 is stretched at the back end side of the pair of grip arms 21, 25 as shown in FIG. 11, and the extension spring 34 is rotationally biased in a direction to open the front end side where the disc holding pads 24a, 25a are attached.

Further, at the other end side of the pair of grip arms 24, 25, as shown in FIG. 6, a pair of engagement pins 32, 33 are projected toward the lateral direction. These engagement pins 32, 33 are adapted so that when the grip mechanism supporting member 31 which supports the disc grip mechanism 74 is attached to the movement member 39, the engagement pins 32, 33 are engaged with a cam groove 40 bored through the other side plate 39c of the movement member 39. In this example, as shown in FIG. 6, the pair of engagement pins 32, 33 are projected toward the other side plate 39c of the supporting member 39 through an opening portion 35d bored through the other side plate 31c of the grip mechanism supporting member 31.

Figure 13:
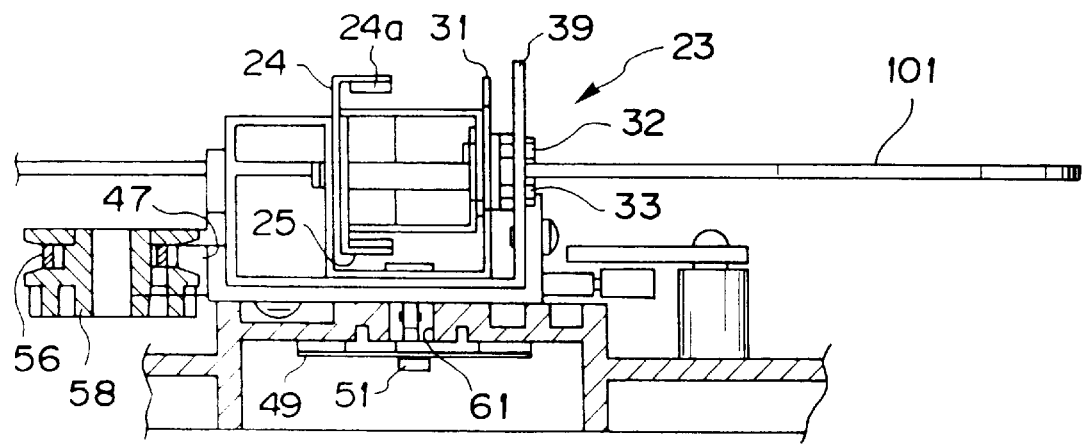
FIG. 13 is a front view showing the state where the disc drawing mechanism is attached to disc carrying body.
Figure 14:
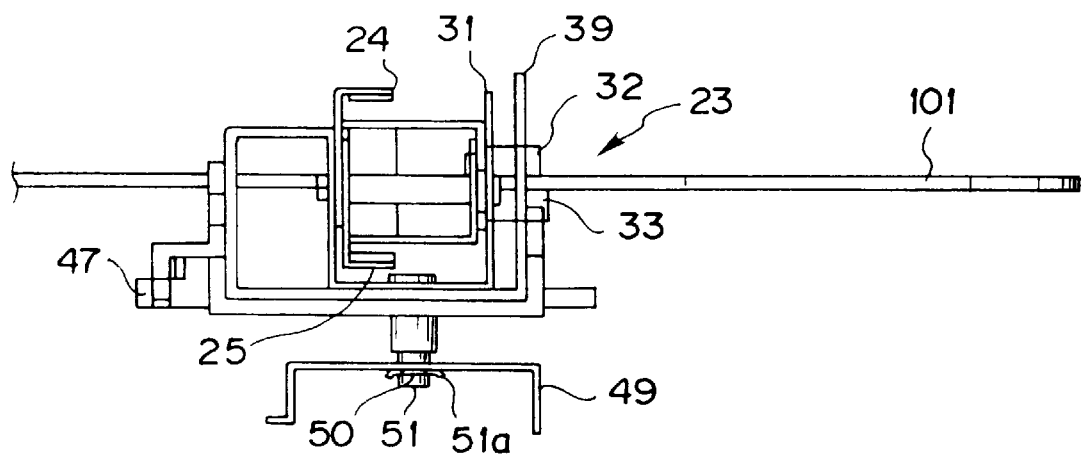
FIG. 14 is a front view showing the essential part of the disc drawing mechanism.

The grip mechanism supporting member 31 to which the disc grip mechanism 74 is attached as described above is disposed in such a manner that it is fitted (assembled) between the side plates 39b, 39c of the movement member 39 in the state where the operation shaft 35 is inserted through the elongated hole 52 and the engagement pins 32, 33 of the disc grip mechanism 74 are inserted into the cam groove 40. Further, the extension spring 76 is stretched between the supporting member 39 and the grip mechanism supporting member 31 so that the both members are connected to each other. As shown in FIGS. 13 and 14, the movement member 39 which supports the grip mechanism supporting member 31 is disposed on the disc carrying body 7 in the state where the movement guide shaft 51 is inserted through the movement guide groove 61. At this time, the operation shaft 35 provided at the grip mechanism supporting member 31 supported by the movement member 39 is also inserted through the movement guide groove 61. The movement guide shaft 51 and the operation shaft 35 are connected to the movement guide member 49 disposed at the lower surface side opposite to the surface where the movement member 39 is disposed on the disc carrying body 7. The movement guide shaft 51 is connected to the movement guide member 49 by inserting the movement guide shaft 51 through the elongated hole 50 bored through the movement guide member 49, and allowing a washer 51a for prevention of slipping off to be fitted with respect to the front end side. Moreover, the operation shaft 35 is connected to the movement guide member 49 at the front end side of the movement guide member 49. By connecting the movement guide shaft 51 and the operation shaft 35 to the movement guide member 49 disposed at the lower surface side of the disc carrying body 7, the movement member 39 and the grip mechanism supporting member 31 hold the disc carrying body 7 therebetween in a manner to cooperate with the movement guide member 49, Thus, the movement member 39 and the grip mechanism supporting member 31 are disposed on the disc carrying body 7 in the state where slipping off from the disc carrying body 7 is prevented. Accordingly, the movement member 39, the grip mechanism supporting member 31 and the movement guide member 49 are moved on the disc carrying body 7 in one body while being guided by the guide groove 61.

Meanwhile, at respective corner portions of the movement guide member 49, as shown in FIG. 6, elastic displacement portions 49a for pressing the lower surface side of the disc carrying body 7 are formed so as to extend from the respective corner portions of the movement guide member 49. When the disc carrying body 7 is held by the movement member 39, the grip mechanism supporting member 31 and the movement guide member 49, the elastic displacement portions 49a are caused to be elastically in pressure-contact with the lower surface of the disc carrying body 7, whereby the movement member 39 and the grip mechanism supporting member 31 are supported on the disc carrying body 7 in a stable state, and are supported on the disc carrying body 7 so that they are moved on the disc carrying body 7 in a stable state.

In this example, the movement member 39 is connected to the movement guide member 49 in the state where the movement guide shaft 51 is inserted into the elongated hole 50 and is permitted to be relatively moved with respect to the movement guide member 49 and the grip mechanism supporting member 31 within the range of the elongated hole 50.

Further, at the disc carrying body 7, there is provided a movement operation mechanism 75 for allowing the movement member 39 to undergo movement operation in the direction indicated by arrow $E_1$ and in the direction indicated by arrow $E_2$ in FIG. 2 along the guide groove 61. This movement operation mechanism 75 comprises a drive motor 53 attached on the disc carrying body 7, a drive force transmission gear mechanism 55 composed of plural gears connected to a drive gear 54 attached to the drive shaft of the drive motor 53, and a timing belt 56 laid across the first and second gears 57, 58. This timing belt 56 is connected to the movement member 39 disposed on the disc carrying body 7 by fixing the middle portion to a belt connecting portion 47.

In this example, the drive force transmission gear mechanism 55 is connected to the first gear 57 to transmit drive force of the drive motor 53 to the first gear 57.

Further, when the drive motor 53 of the movement operation mechanism 75 is driven, the timing belt 56 is moved. Thus, the movement member 39 is caused to undergo movement operation in the direction indicated by arrow $E_1$ or in the direction indicated by arrow $E_2$ in FIG. 2 while being guided by the guide groove 61 in accordance with the rotational direction of the drive motor 53.

Meanwhile, the grip mechanism supporting member 31 supported by the movement member 39 disposed on the disc carrying body 7 is adapted so that when it is in the state biased by experiencing biasing force of the extension spring 76 so that it can be moved toward the front side of the movement member 39 in the direction indicated by arrow $G_1$ in FIGS. 6 and 7, there results the state where the pair of engagement pins 33, 32 of the disc grip mechanism 74 are respectively engaged with first and second inclined groove portions 41, 42 of the cam groove 40 thereby placing the optical disc 101 in the state where it can be gripped or grasped, in which the front end sides of the first and second grip arms 24, 25 are spaced from each other.

Further, when the grip mechanism supporting member 31 is moved toward the backward side of the movement member 39 in the direction indicated by arrow $G_2$ in FIGS. 6 and 7, the engagement pin 44 that is attached to the front end of the engagement lever 45 that is attached to the other side plate 39c of the movement member 39 rides onto an inclined surface portion 38 formed continuously with the engagement recessed portion 37 at the backward end side of the upper edge side of the other side plate 31c of the grip mechanism supporting member 31. As a result, the engagement lever 45 is rotated in the direction indicated by arrow $F_2$ in FIG. 6 against biasing force of the torsion coil spring 46.

When the grip mechanism supporting member 31 is moved toward the backward side of the movement member 39 in the direction indicated by arrow $G_2$ in FIGS. 6 and 7, the pair of engagement pins 33, 32 of the disc grip mechanism 74 are moved to the horizontal groove portion 40a side of the cam groove 40 to close the front end sides of the first and second grip arms 24, 25 thus allowing gripping or grasping of the optical disc 101 engaged with the engagement recessed portion 48.

When the grip mechanism supporting member 31 is further moved toward the backward side of the movement member 39 in the direction indicated by arrow $G_2$ in FIGS. 6 and 7, the engagement pin 44 rides across the inclined surface portion 38, resulting in the state where it is opposite to the engagement recessed portion 37. As a result, the engagement lever 45 undergoes biasing force of the torsion coil spring 46, and is thus rotated in the direction indicated by arrow $F_1$ in FIG. 6. Thus, the engagement lever 45 is engaged into the engagement recessed portion 37. At this time, since the engagement pin 44 is engaged with the engagement recessed portion 37, The grip mechanism supporting member 31 is prevented from moving toward the forward side with respect to the movement member 39 to maintain the gripped state of the optical disc 101 by the disc grip mechanism 74.

Since the engagement lever 45 is caused to undergo rotational operation in the direction indicated by arrow $F_2$ in FIG. 6 against biasing force of the torsion coil spring 46, the engagement pin 44 serves to release the engagement with respect to the engagement recessed portion 37, thus permitting movement toward the front side in the direction indicated by arrow $G_1$ in FIGS. 6 and 7 with respect to the movement member 39 of the grip mechanism supporting member 31.

Figure 15:
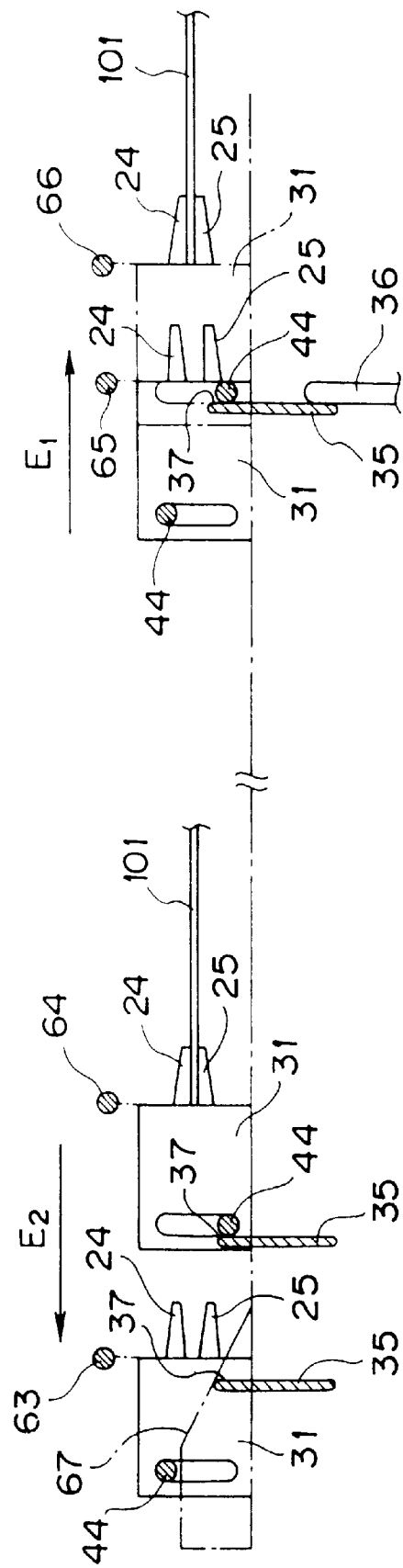
FIG. 15 is an explanatory view for explaining the movement state of the disc drawing mechanism.

Further, on the disc carrying body 7, as shown in FIG. 15, a holding member 36 and a cam piece 67 are provided in positions on the movement locus of the disc drawing mechanism 23. The holding member 36 is provided at the position allowing the disc drawing mechanism 23 to move in the direction indicated by arrow $E_1$ in FIG. 15 on the disc carrying body 7 so that it is moved to the position close to the disc accommodating body 2 side. Upon such movement the operation shaft 35 provided at the movement member 31 comes into contact with the holding member 36. Moreover, when the disc drawing mechanism 23 is moved toward the backward side of the disc carrying body 7 in the direction indicated by arrow $E_2$ in FIG. 15 so as to be spaced or away from the disc accommodating body 2 so that it is moved to the position where it has completed drawing operation from the disc accommodating body 2 of the optical disc 101, the operation shaft 35 comes into contact with the cam piece 67, and the engagement pin 44 of the engagement lever 45 runs or rides onto the inclined surface of the cam piece 67. In addition, the engagement lever 45 is rotated in the direction indicated by arrow $F_2$ in FIG. 6 against biasing force of the torsion coil spring 46 to release the engagement with respect to the engagement recessed portion 37 of the engagement pin 44.

The operation of the disc drawing mechanism 23 will now be described in more practical sense. The disc drawing mechanism 23 including the movement member 39 which supports the grip mechanism supporting member 31 to which the disc grip mechanism 74 is attached is placed in the state where it is moved to the first position which is the withdrawal position spaced, to the maximum degree, from the disc carrying body 2 as shown in FIG. 2. At this time, the engagement pin 44 attached to the engagement lever 45 is in the state where it rides on the cam piece 67 as shown in FIG. 15. Namely, there results the state where the engagement lever 45 is rotated in the direction indicated by arrow $F_2$ in FIG. 6 against biasing force of the torsion coil spring 46 so that the engagement lever 45 is withdrawn from the engagement recessed portion 37 of the grip mechanism movement member 39. Accordingly, the grip mechanism supporting member 31 undergoes biasing force of the extension spring 76, and is thus biased so that it can be moved in the direction indicated by arrow $G_1$ in FIG. 6 with respect to the supporting member 31 to project first and second pressing portions 62a, 62b provided at the front end portions of side plates 31b, 31c from the gripping supporting mechanism member 31.

At this time, the first position detecting switch 63 disposed on the disc carrying body 7 is operated by the movement member 39. Thus, it is detected that the disc drawing mechanism 23 is located at the first position.

When the drive motor 53 of the movement operation mechanism 75 is driven in a forward rotational direction in the state where the disc drawing mechanism 23 is located at the first position shown in FIG. 2 which is the initial position, the timing belt 56 is traveled in the direction indicated by arrow $J_1$ in FIG. 2 to move the disc drawing mechanism 23 in the direction indicated by arrow $E_1$ in FIG. 2 close to the disc accommodating body 2. At this time, since the grip mechanism supporting member 31 is connected to the movement member 39 through the extension spring 76, It is moved in the direction indicated by arrow $E_1$ in FIG. 2 in one body with the movement member 39. Moreover, the pair of grip arms 24, 25 of the disc grip mechanism 74 attached to the grip mechanism supporting member 31 are placed in the state where the engagement pins 32, 33 are respectively engaged with first and second inclined cam grooves 41, 42 of the cam groove 40 provided at the movement member 39, i.e., in the state where the optical disc 101 is permitted to be gripped or grasped, in which their front end sides are spaced from each other.

Figure 16:
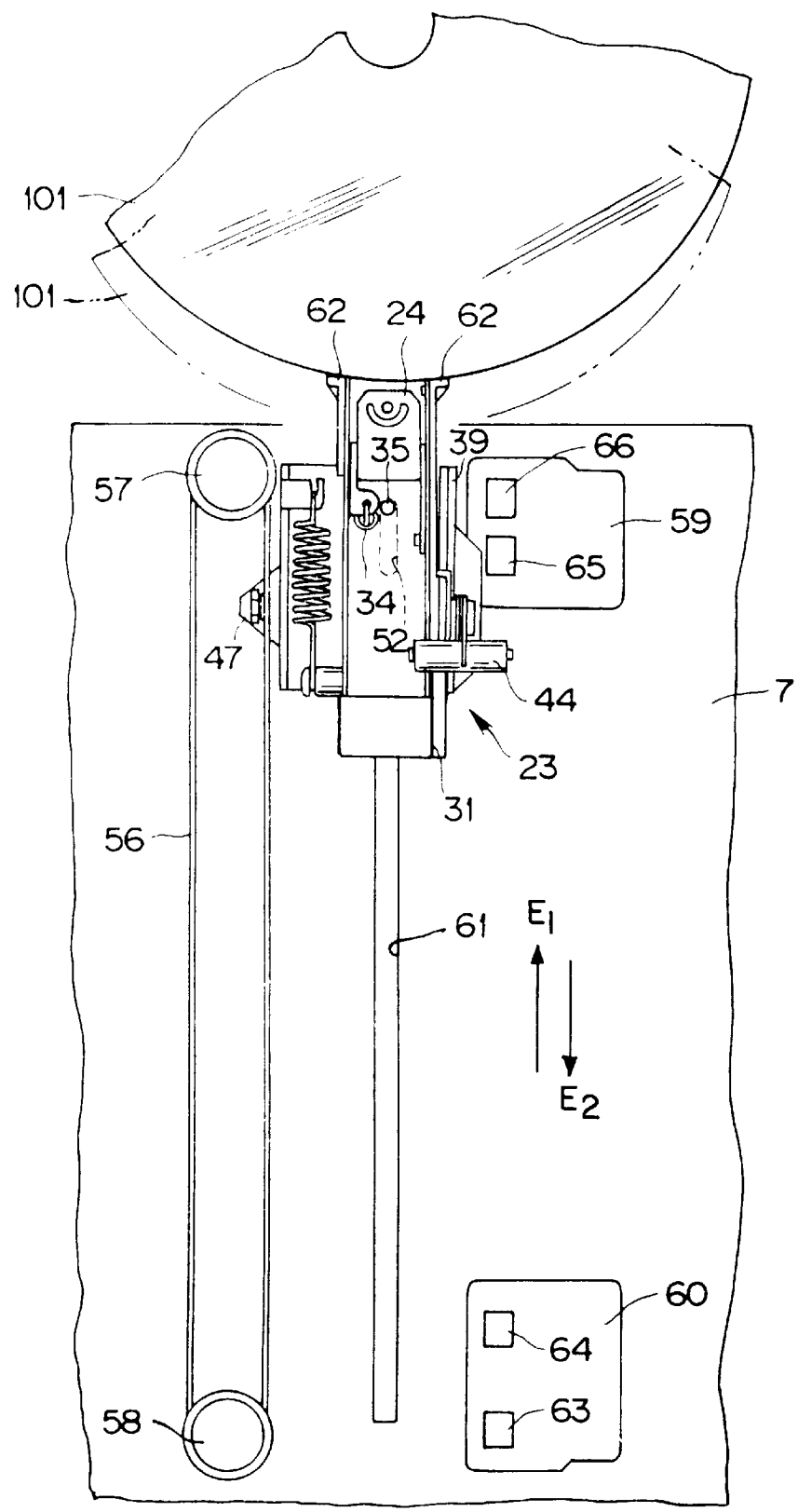
FIG. 16 is a plan view showing the state where the disc drawing mechanism is moved to second position where it becomes close to the disc accommodating body.
Figure 17:
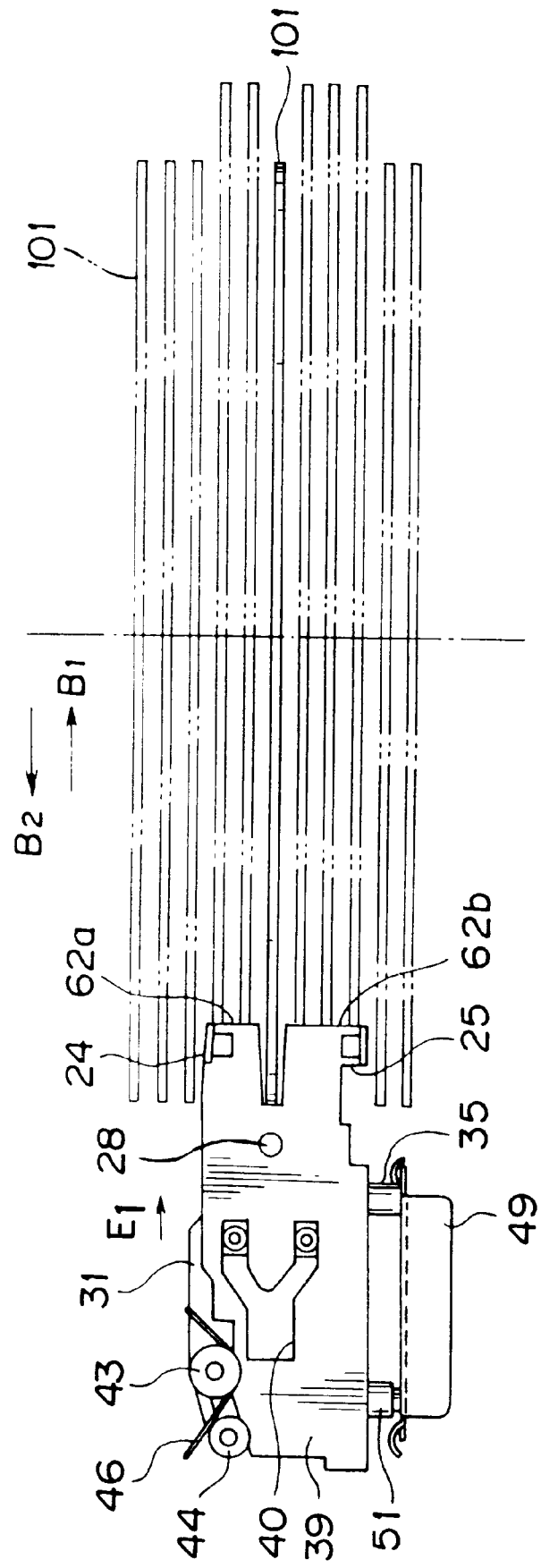
FIG. 17 is a side view showing the state where the disc drawing mechanism is moved to the second position where it becomes close to the disc accommodating body.

Further, when the disc drawing mechanism 23 moves in the direction indicated by arrow $E_1$ in FIG. 2 that is the direction close to the disc accommodating body 2 from the first position shown in FIG. 2 to reach the second position shown in FIG. 16, the first and second pressing portions 62a, 62b of the grip mechanism supporting member 31 are caused to be admitted into the disc accommodating body 2, the operation shaft 35 provided at the lower surface side of the bottom plate 31a of the grip mechanism supporting member 31 comes into contact with the holding member 36 provided at the disc carrying body 7 as shown in FIG. 15 to stop the grip mechanism supporting member 31 with respect to the disc carrying body 7. At this time, as shown in FIGS. 16 and 17, the first and second pressing portions 62a, 62b provided at the front end portion of the grip mechanism supporting member 31 press the optical disc 101 accommodated and held within the disc accommodating body 2 in the direction indicated by arrow $B_1$ in FIGS. 16 and 17 which is the direction toward the inside of the disc accommodating body 2. At this time, as shown in FIG. 17, the optical discs 101 pressed or pushed by the first and second pressing portions 62a, 62b are positioned in a manner adjacent to each other in upper and lower directions relative to a predetermined optical disc 101 drawn out. Further, as the result of the fact that the optical discs 101 are pressed by the first and second pressing portions 62a, 62b, the disc pressing spring 20 is pressed by the optical discs 101 so that it is caused to undergo elastic deformation in the direction indicated by arrow $K_1$ in FIG. 2. Thus, elastic force for moving the optical discs 101 which have pressed each disc pressing spring 20 in the direction indicated by arrow $E_2$ in FIG. 17 in the direction to project it from the disc accommodating body 1 is stored (accumulated).

Further, when the first and second pressing portions 62a, 62b press other optical discs 101 positioned in a manner adjacent to each other in upper and lower directions relative to a predetermined optical disc 101 caused to undergo drawing operation, the predetermined optical disc 101 is projected from the disc accommodating body 2 with respect to other optical discs 101. Thus, the outer circumferential edge portion of the optical disc 101 caused to undergo drawing operation is admitted into the engagement recessed portion 48 formed at the front end portion of the grip mechanism supporting member 31.

When the disc drawing mechanism 23 is moved to the second position shown in FIG. 16, the second position detecting switch 65 disposed on the disc carrying body 7 is operated by the movement member 39. Thus, it is detected that the disc drawing mechanism 23 has been moved to the second position.

After the disc drawing mechanism 23 has been moved to the second position, the drive motor 53 is further driven in the forward rotational direction. Thus, the timing belt 56 is traveled in the direction indicated by arrow $J_1$ in FIG. 2. At this time, since the grip mechanism supporting member 31 allows the operation shaft 35 to be in contact with the holding member 36 provided at the disc carrying body 7 as shown in FIG. 15, there results the state where further movement toward the inside of the disc accommodating body 2 is limited. Accordingly, only the movement member 39 moves in the direction indicated by arrow $E_1$ in FIGS. 16 and 17 toward the disc accommodating body 2 side. Namely, the movement member 39 moves in the direction indicated by arrow $E_1$ in FIGS. 16 and 17 within the range of the elongated hole 52 with which the movement guide shaft 51 provided at the grip mechanism supporting member 31 is engaged.

Further, when only the movement member 39 is moved in the direction indicated by arrow $E_1$ in FIGS. 16 and 17, since movement following the movement member 31 of the grip mechanism supporting member 39 is limited, the engagement pins 32, 33 provided at the pair of grip arms 24, 25 of the grip mechanism 74 are moved toward the horizontal groove portion 40a side away from the position where the engagement pins 33, 32 are respectively engaged with first and second inclined cam grooves 41, 42 of the cam groove 40 provided at the movement member 39. Further, the pair of grip arms 24, 25 are respectively rotated with the support shaft 28 acting as the center in the direction indicated by arrow M and in the direction indicated by arrow $M_2$ in FIGS. 11 and 18 to allow the front end portion sides to be close to each other against biasing force of the extension spring 33.

Figure 18:
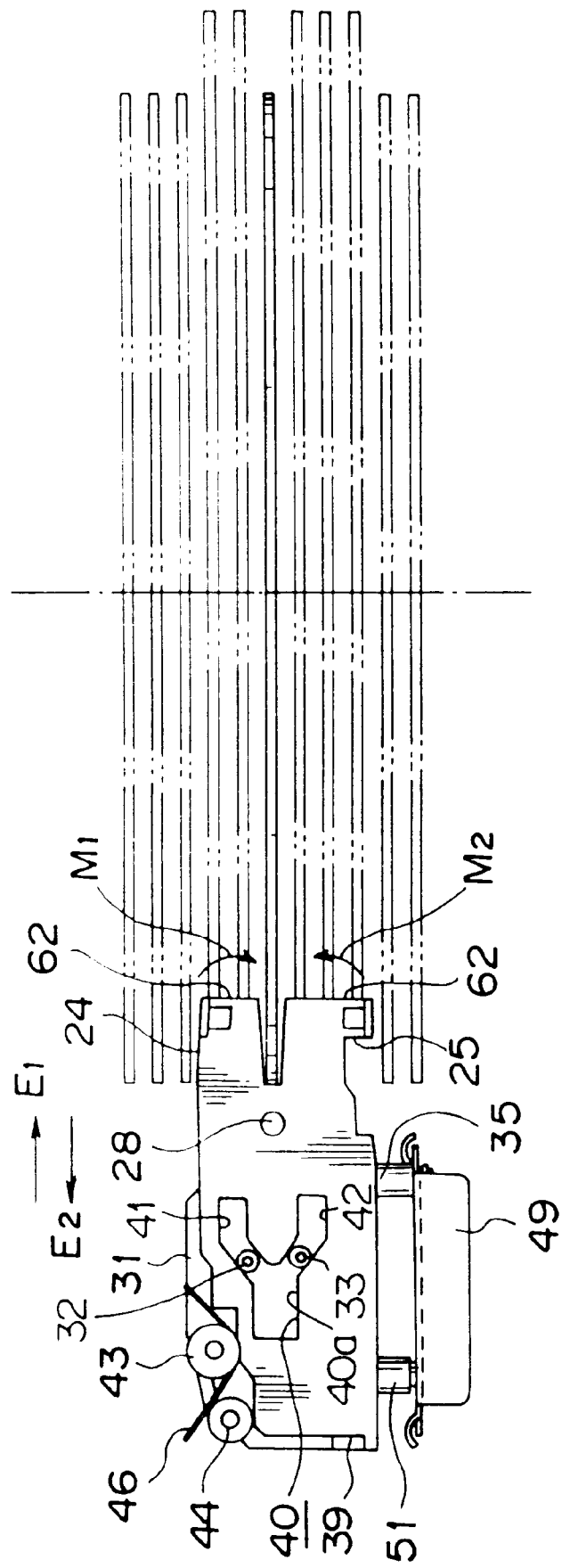
FIG. 18 is a side view showing the state where disc grip mechanism of the disc drawing mechanism grips or grasps the optical disc held within the disc accommodating body.
Figure 19:
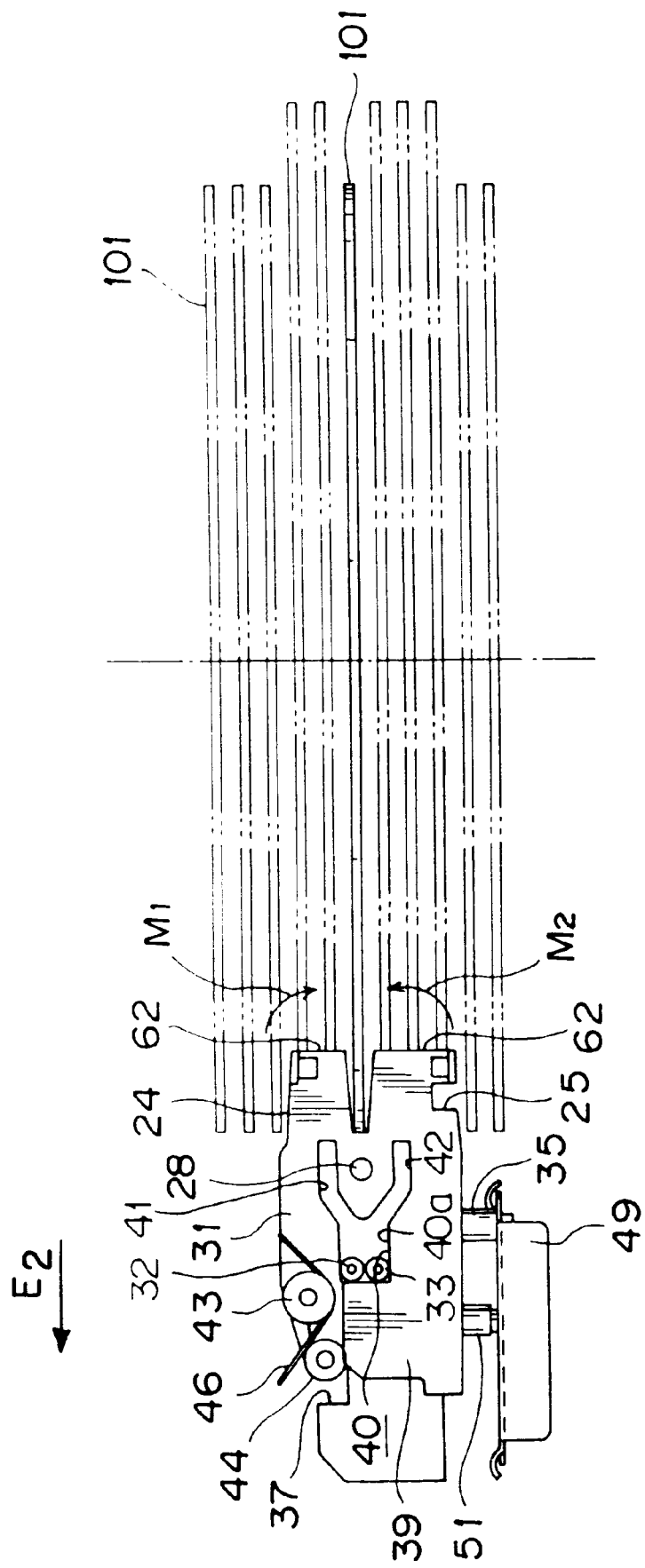
FIG. 19 is a side view showing the state where the disc grip mechanism grips or grasps the optical disc held within the disc accommodating body.

Further, when the drive motor 53 is driven in the forward rotational direction so that the movement member 39 is moved in the direction indicated by arrow $E_1$ in FIG. 18, the engagement pins 32, 33 are admitted into the horizontal groove portion 40a of the cam groove 40. As a result, the pair of grip arms 24, 25 are respectively rotated with the support shaft 28 acting as the center in the direction indicated by arrow $M_1$ and in the direction indicated by arrow $M_2$ in FIG. 18 thus to grip or grasp the outer circumferential edge portion of the predetermined optical disc 101 engaged with the engagement recessed portion 48 as shown in FIG. 19.

The disc grip mechanism 74 constituting this invention serves to grip or grasp, by the pair of grip arms 24, 25, one optical disc positioned between optical discs 101 pushed down by the first and second pressing portions 62a, 62b, and relatively projected with respect to these optical discs 101. Accordingly, it is possible to grip or grasp, from upper and lower directions, a predetermined one optical disc 101 from plural optical discs 101 accommodated within the disc accommodating body 2 in such a manner that they are stacked to each other at intervals (spacings) such that the pair of grip arms 24, 25 cannot be admitted.

Further, after movement of the grip mechanism supporting member 31 is limited, only the movement member 31 is moved in the direction indicated by arrow $E_1$ in FIGS. 16 and 17 and the engagement pin 44 of the engagement lever 45 attached to the supporting member 39 runs or rides onto the inclined surface portion 38 formed at the other side plate 31c of the grip mechanism supporting member 31. Further, when the movement member 31 is moved up to the position where the pair of grip arms 24, 25 grip or grasp one optical disc 101, i.e., the third position shown in FIG. 20, the engagement pin 44 is engaged With the engagement recessed portion 37 formed at the other side plate 31c of the rip mechanism supporting member 31 a s shown in FIG. 19. As the result of the fact that the engagement pin 44 is engaged with the engagement recessed portion 37, movement with respect to the movement member 39 o f the grip mechanism supporting member 31 is limited, thereby maintaining the state where the pair of grip arms 24, 25 have gripped or grasped the optical disc 101. then the movement member 39 is moved to the third position shown in FIG. 20 where it is relatively moved with respect to the grip mechanism supporting member 31, a third position detecting switch 66 provided on the disc carrying body 7 is operated by the movement member 39. As a result, it is detected that the movement member 39 has been moved to the third position. Thus, the drive state in the forward rotational direction of the drive motor 53 is stopped.

When it is detected by the third position detecting switch 66 that the movement member 39 has been moved to the third position where the predetermined one optical disc 101 accommodated within the disc accommodating body 2 is gripped or grasped by the disc grip mechanism 74, the drive motor 53 of the movement operation mechanism 75 is once stopped, and then begins being driven in a backward rotational direction. When the drive motor 53 is driven in the backward rotational direction, the timing belt 56 is traveled in the direction indicated by arrow $J_2$ in FIG. 20. Thus, the movement member 39 connected to the timing belt 56 is moved in the direction indicated by arrow $E_2$ in FIG. 20 on the disc carrying body 7. At this time, since the engagement pin 44 is engaged with the engagement recessed portion 37, the grip mechanism supporting member 31 is moved in the direction indicated by arrow $E_2$ in FIG. 20 spaced or away from the disc accommodating body 2 in one body with the movement member 39 while maintaining the state where the predetermined one optical disc 101 is gripped or grasped by the disc grip mechanism 74. When the drive motor 53 is further driven in the backward rotational direction, the grip mechanism supporting member 31 is moved in the direction indicated by arrow $E_2$ in FIGS. 19 and 20 spaced or away from the disc accommodating body 2 in one body with the movement member 39 thus to draw out, from the disc accommodating body 2, the predetermined one optical disc 101 gripped or grasped by the disc grip mechanism 74 as shown in FIG. 21.

Figure 22:
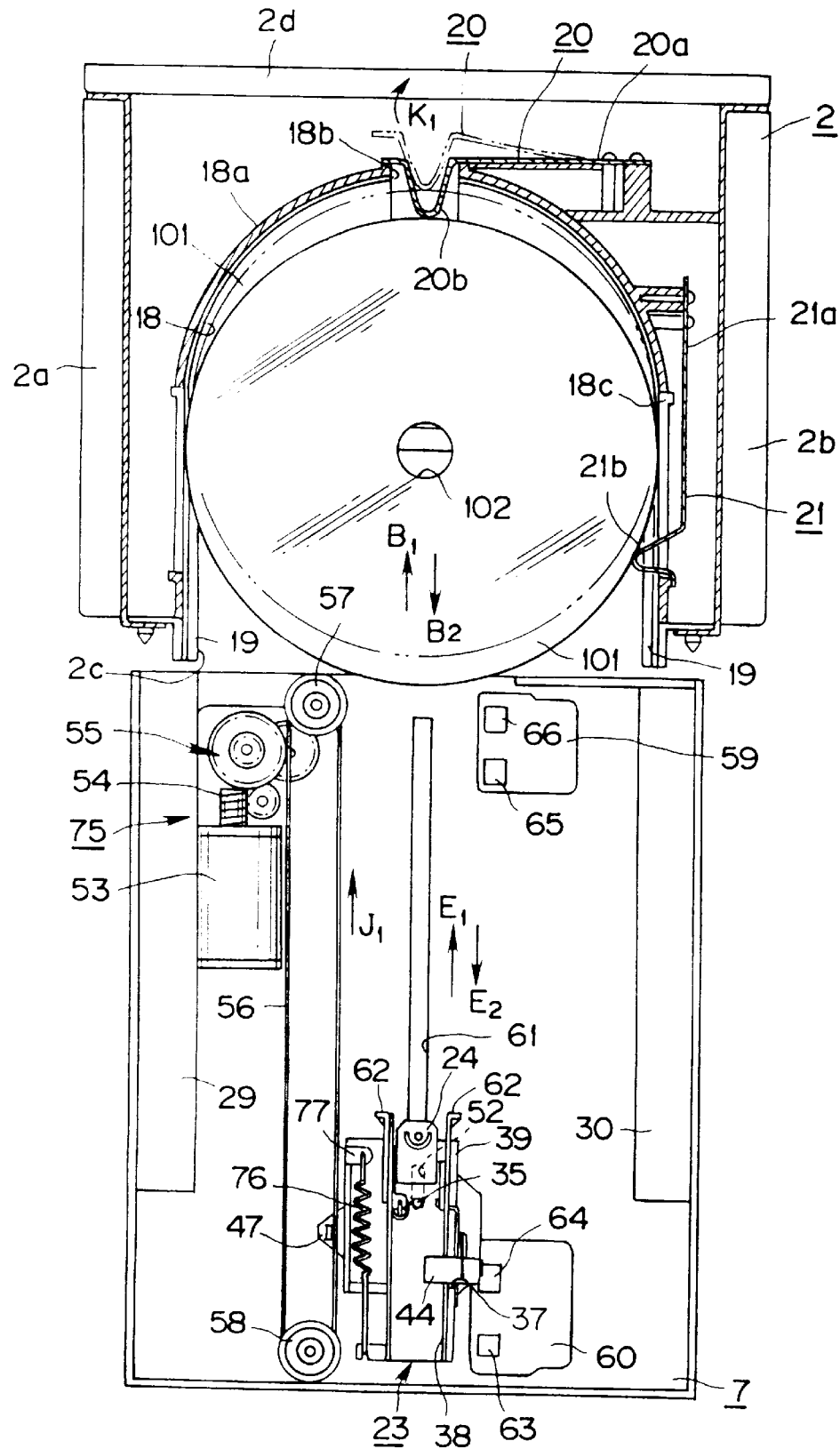
FIG. 22 is a side view showing the state where the disc drawing mechanism is moved to fourth position where it draws out optical disc from the disc accommodating body.
Figure 23:
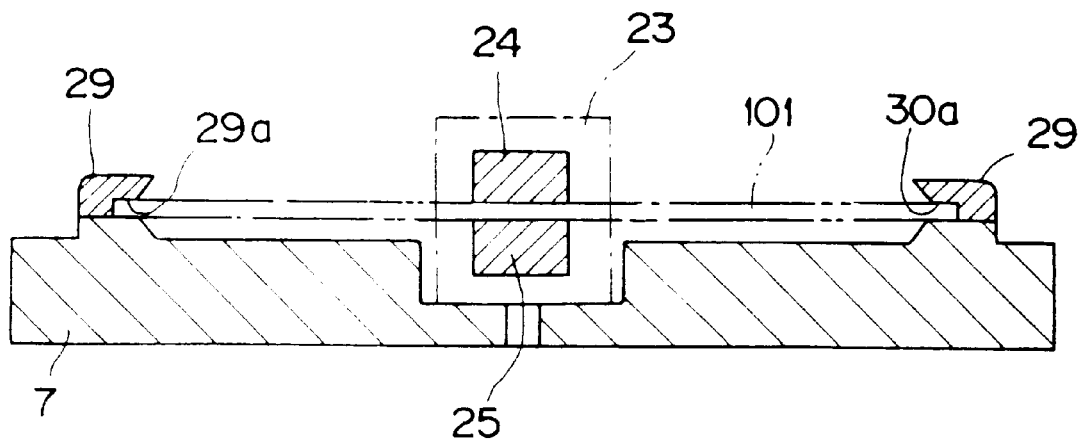
FIG. 23 is a cross sectional view showing the state where optical disc drawn out from the disc accommodating body is mounted on disc carrying body

Further, when the movement member 39 is moved to the fourth position shown in FIG. 22 where it has been moved to the first position side relative to the central position of the disc carrying body 7, the optical disc 101 gripped or grasped by the disc grip mechanism 74 is moved to the central position on the disc carrying body 7. When the optical disc 101 is moved up to the central position of the disc carrying body 7, it is engaged with engagement grooves 29a, 30a provided at a pair of left and right disc supporting members 29, 30, respectively, provided on the both sides of the disc carrying body 7 as shown in FIG. 23.

Further, when the movement member 39 moves the optical disc 101 gripped or grasped by the disc grip mechanism 74 to the fourth position which is the drawing position located at the central portion of the disc carrying body 7, the movement member 39 operates (actuates) a fourth position detecting switch 64 disposed on the disc carrying body 7. Thus, it is detected that the optical disc 101 has been moved to the fourth position.

At this time, the operation shaft 35 provided at the grip mechanism supporting member 31 comes into contact with the cam piece 67 as shown in FIG. 15, thus resulting in the state where movement with respect to the disc carrying body 7 is limited. When the drive motor 53 is further driven in the backward rotational direction so that the movement member 39 is moved in a direction toward the first position which is the initial position in the direction indicated by arrow $E_2$ in FIGS. 21 and 22 from the fourth position, the engagement pin 44 of the engagement lever 45 runs or rides onto the inclined surface of the cam piece 67. Further, the engagement lever 45 is rotated in the direction indicated by arrow $F_2$ in FIG. 6 against biasing force of the torsion coil spring 46 to release engagement with respect to the engagement recessed portion 37 of the engagement pin 44. When the engagement with respect to the engagement recessed portion 37 of the engagement pin 44 is released, the grip mechanism supporting member 31 undergoes biasing force of the extension spring 76 so that it is relatively moved in the direction indicated by arrow $G_1$ in FIG. 6 within the range of the elongated hole 52 in the bottom of the movement member 39. When the grip mechanism supporting member 31 undergoes biasing force of the extension spring 76 so that it is moved in the direction indicated by arrow $G_1$ in FIG. 6, the engagement pin 44 runs or rides onto the inclined surface portion 38 so that it is engaged with the engagement recessed portion 37. At this time, as shown in FIG. 2, the grip mechanism supporting member 31 is held at the position of the initial state where the first and second disc pressing portions 62a, 62b at the front end thereof are caused to be projected from the front end of the movement member 39.

Figure 24:
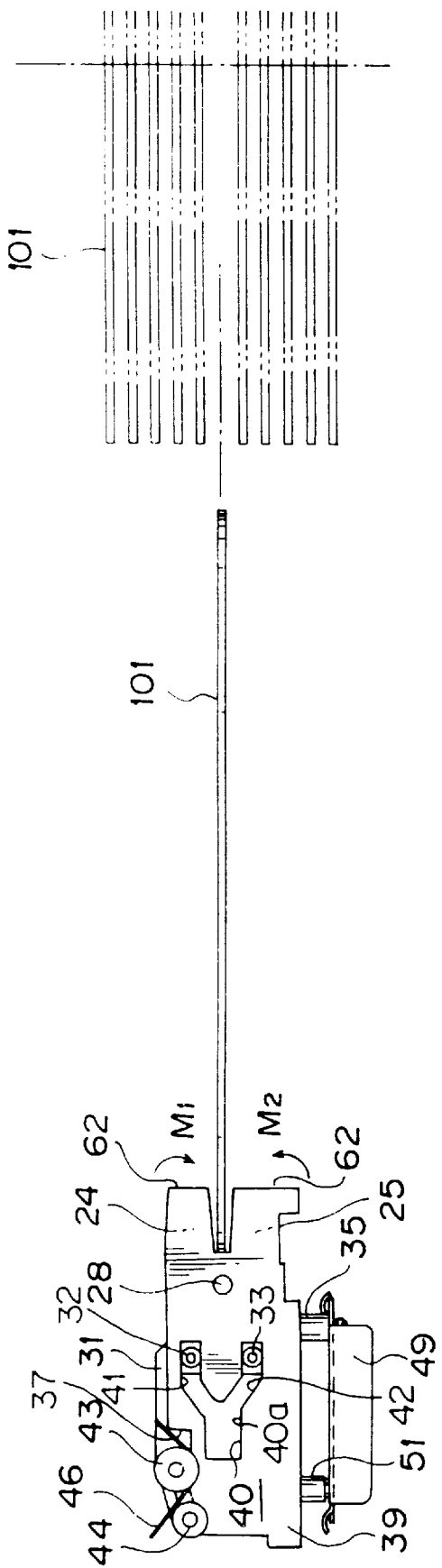
FIG. 24 is a side view showing the state where the disc drawing mechanism is moved to first position after it draws out optical disc from the disc accommodating body.

Further, when the grip mechanism supporting member 31 is relatively moved in a direction opposite to the movement member 39, the engagement pins 33, 32 provided at the pair of grip arms 24, 25 of the disc grip mechanism 74 are moved from the position engaged with the horizontal groove portion 40a of the cam groove 40 provided at the movement member 39 toward the position engaged with the first and second inclined cam grooves 41, 42, respectively. Further, the pair of grip arms 24, 25 undergoes biasing force of the extension spring 34 so that they are respectively rotated with the support shaft 28 acting as the center in a direction opposite to the direction indicated by arrow $M_1$ and in a direction opposite to the direction indicated by arrow $M_2$ in FIGS. 11 and 24 to allow their front end portion sides to be spaced from each other, thereby releasing the holding state with respect to the optical disc 101 which has been caused to undergo drawing operation. Thus, there results the state where the optical disc 101 is mounted on the disc carrying body 7. At this time, the optical disc 101 which has been drawn out is supported by the disc supporting members 29, 30 so that mounting position onto the disc carrying body 7 is maintained. Thus, slipping off from the disc carrying body 7 is prevented.

When the drawing operation of the predetermined optical disc 101 from the disc accommodating body 2 is completed, the drive motor of the vertical movement operation mechanism 70 begins being driven. When this drive motor begins being driven, the timing belt 9 is traveled. Thus, the disc carrying body 7 connected to the timing belt 9 is caused to undergo movement operation in the direction indicated by arrow $D_1$ or in the direction indicated by arrow $D_2$ in FIG. 1 perpendicular to the principal surface of the optical disc 101 accommodated within the disc accommodating body 2 while being guided by the supporting shafts 10, 11. At this time, in the case where it is designated that the drawn optical disc 101 is loaded with respect to, e.g., the first recording/ reproduction unit 5, the disc carrying body 7 is moved to the position opposite to the first recording/reproduction unit 5. When the disc carrying bony 7 is moved to the position opposite to the first recording/reproduction unit 5, drive of the drive motor of the vertical movement operation mechanism 71 is stopped and the drive motor 53 of the movement operation mechanism 75 begins being driven in the forward rotational direction. Thus, the disc drawing mechanism 23 is moved in the direction indicated by arrow $E_1$ in FIG. 2. Further, the optical disc 101 which has been drawn onto the disc carrying body 7 is pressed by the grip mechanism supporting member 31 in the state where the outer circumferential edge portion is caused to be engaged with the engagement recessed portion 48 so that it is moved in the direction indicated by arrow $E_1$ in FIG. Thus, the optical disc 101 is inserted into the first recording/reproduction unit 5 through the disc insertion/withdrawal hole. When the drive motor 53 is further driven in the forward rotational direction so that the disc drawing mechanism 23 is moved up to the second position shown in FIG. 16, the optical disc 101 which has been drawn onto the disc carrying body 7 is inserted into the first recording/reproduction unit 5. When Insertion into the first recording/reproduction unit 5 of the optical disc 101 is carried out, the loading mechanism provided at the first recording/reproduction unit 5 starts its operation. As a result, loading operation of th is optical disc 101 is carried out. Thus, recording and/or reproduction of information signals with respect to the optical disc 101 is carried out.

When insertion into the first recording/reproduction unit 5 of the optical disc 101 which has been drawn onto the disc carrying body 7 is completed, the drive motor 53 of the movement operation mechanism 75 is driven in the backward rotational direction to move the disc drawing mechanism 23 in the direction indicated by arrow $E_2$ in FIG. 16 to return the disc drawing mechanism 23 to the first position which is the initial position shown i n FIG. 2.

In the case where it is designated that the optical disc 101 which has been drawn onto the disc carrying body 7 is loaded with respect to, e.g., the second recording/ reproduction unit 6, the disc carrying body 7 is moved to the position opposite to the second recording/reproduction unit 6. By the operation similar to the above, insertion and loading with respect to the second recording/reproduction unit 6 of the optical disc 101 are carried out. Thus, recording and/or reproduction of information signals are carried out.

Moreover, the vertical movement operation mechanism 71 and the disc drawing mechanism 23 can be operated (actuated) also when recording and/or reproduction of information signals with respect to the optical disc 101 are being carried out at the first or second recording/reproduction units 5, 6. For example, in the case where a second optical disc 101 accommodated within the disc accommodating body 2 is designated after insertion of a first optical disc 101 into the first recording/reprocuction unit 5 is completed, the vertical movement operation mechanism 71 moves the disc carrying body 7 up to the position opposite to optical disc 101. Following movement of the disc carrying body 7, the movement operation mechanism 75 is operated (actuated). As a result, drawing operation of the second optical disc 101 as described above by the disc drawing mechanism 23 is carried out, and loading operation with respect to the second recording/reproduction unit 6 of the optical disc 101 is carried out. Thus, recording and/or reproduction of information signals are carried out.

Accordingly, the disc recording/reproduction unit according to this invention can continuously record and/or reproduce information signals by using the first and second recording/reproduction units 5, 6 while successively exchanging plural optical discs 101 accommodated and held within the disc accommodating body 2.

Further, when recording and/or reproducing operation of the first or second recording/reproduction units 5, 6 into which the optical discs 101 are loaded are completed, the vertical movement operation mechanism 71 moves the disc carrying body 7 to the position opposite to the first or second recording/reproduction unit 5, 6. Following the movement of this disc carrying body 7, the movement operation mechanism 75 starts its operation to move the disc drawing mechanism 23 to the second position shown in FIG. 16. When eject operation of the first or second recording/ reproduction unit 5, 6 is carried out following the movement to the second position of the disc drawing mechanism 23, the optical disc 101 loaded with respect to the first or second recording/reproduction unit 5, 6 is projected through the disc insertion/withdrawal hole to engage the outer circumferential edge portion thereof with the engagement recessed portion 48 formed at the front end portion of the grip mechanism supporting member 31. The movement member 39 of the disc drawing mechanism 23 is further moved to the third position side shown in FIG. 20 from the second position shown in FIG. 16 following the eject operation of the optical disc 101, whereby the grip mechanism 74 is operated (actuated) as previously described to carry out gripping or grasping of the ejected optical disc 101. When gripping or grasping of the optical disc 101 is carried out, the drive motor 53 of the movement operation mechanism 75 is driven in the backward rotational direction to move the disc drawing mechanism 23 in the direction indicated by arrow $E_2$ in FIG. 22. Thus, drawing operation from the first or second recording/reproduction unit 5, 6 of the optical disc 101 is carried out by the operation similar to the drawing operation of the optical disc 101 from the disc accommodating body 2. When the drawing operation onto the disc carrying body 7 of the optical disc 101 is completed, the vertical movement mechanism 71 starts driving operation to move the disc carrying body 7 to the position opposite to the disc supporting portion 18 of the disc accommodating body 2 within which the optical disc 101 ejected from the first or second recording/reproduction unit 5, 6 has been accommodated. Following the movement of this disc carrying body 7, the drive motor 53 of the movement operation mechanism 75 starts drive operation in the forward rotational direction to move the disc drawing mechanism 23 in the direction indicated by arrow $E_1$ in FIG. 22. Further, the optical disc 101 which has been drawn out onto the disc carrying body 7 is pressed by the disc grip mechanism supporting member 31 in the state where its outer circumferential portion is engaged with the engagement recessed portion 48, so the optical disc 101 is moved in the direction indicated by arrow $E_1$ in FIG. 2. Thus, the optical disc 101 is accommodated into the disc supporting portion 18. When accommodation into the disc supporting portion 18 of the optical disc 101 is completed, the disc drawing mechanism 23 is returned to the first position which is the initial position. Thus, a series of returning operations of the optical disc 101 are completed.

Moreover, in the case where exchange of any one optical disc 101 accommodated within the disc accommodating body 2 is designated, the vertical movement operation mechanism 71 moves the disc carrying body 7 to the position opposite to the optical disc 101 for which exchange is designated to carry out drawing operation of this optical disc 101. When the drawing operation of the optical disc 101 for which exchange has been designated is carried out, the vertical movement operation mechanism 71 moves the disc carrying body 7 to the position opposite to the disc exchange mechanism 3. Following the movement to the position opposite to the disc exchange mechanism 3 of the disc carrying body 7, the disc drawing mechanism 23 is moved to the disc exchange mechanism 3 side by the movement operation mechanism 75 to further move the optical disc 101 which has been drawn onto the disc carrying body 7 onto the disc tray 4 of the disc exchange mechanism 3. When the optical disc 101 is mounted on the disc tray 4, the disc exchange mechanism 3 draws the disc tray 4 toward the outside of the outer casing 1 through the insertion/withdrawal hole 16. Then, exchange of the optical disc 101 mounted on the disc tray 4 is carried out by drawing or pulling the disc tray 4 into the outer casing 1 for a second time to allow the optical disc 101 exchanged by the disc drawing mechanism 23 to be mounted on the disc carrying body 7. Then, the disc carrying body 7 is moved by the vertical movement mechanism 71 to the position opposite to the disc supporting portion 18 at which the exchanged optical disc 101 has been accommodated to operate (actuate) the disc drawing mechanism 23 to allow the exchanged optical disc 101 to be accommodated at the disc supporting portion 18. Thus, exchange of the optical disc 101 accommodated in the disc accommodating body 2 is carried out.

The exchange operation of the optical disc 101 accommodated within the disc accommodating body 2 can be carried out also when recording and/or reproduction of information signals are being carried out at the first and second recording/reproduction units 5, 6.

The operations of the vertical movement operation mechanism 71 and the movement operation mechanism 75 described above are controlled on the basis of various command signals inputted to the disc recording/reproduction unit, and/or control signals from the control unit provided within the unit based on detection outputs of first to fourth position detecting switches 63, 64, 65, 66.

The control unit for detecting whether or not optical disc or discs 101 is ir are held at respective disc supporting portions of the disc accommodating body 2 will now be described.

Figure 25:
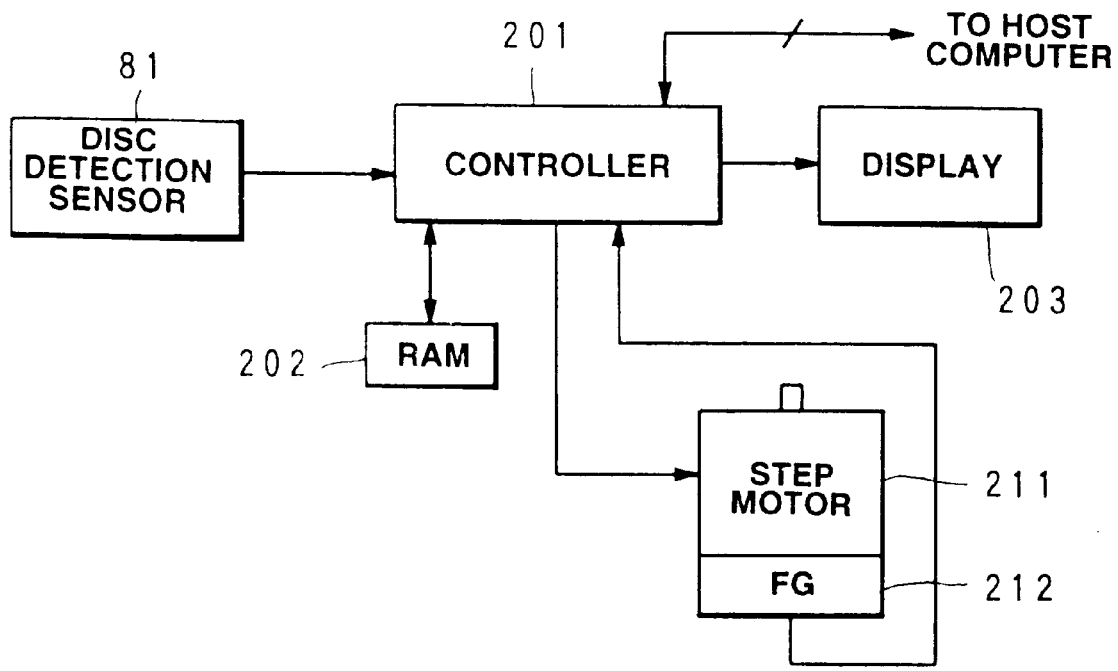
FIG. 25 is a circuit portion showing a control unit for detecting presence of optical disc accommodated within the disc accommodating body.

As shown in FIG. 25, for example, this control unit comprises a controller 201 for detecting on the basis of a signal from the disc detection sensor 81 whether or not the optical disc 101 is held at each disc supporting portion 18, a RAM 202 for temporarily storing detection result, etc., and a display section 203 for displaying such detection result, etc.

The controller 201 delivers, e.g., drive pulse for moving the above-described vertical movement operation mechanism 71 to the position of the first disc supporting portion 18 from the home position toward the upper direction to a step motor 211 for driving the vertical movement operation mechanism 71, e.g., when the power supply of this disc recording/reproduction unit is turned ON or by instruction from the host computer. By this drive signal, the step motor 211 rotates by a predetermined number of rotations. A frequency generator (hereinafter abbreviated as FG) 212 which produces a pulse signal having the number of pulses corresponding to the number of rotations is attached to the rotary shaft of the step motor 211. The controller 201 counts the number of pulses of the pulse signal delivered from the FG 212 to judge whether or not the vertical movement operation mechanism 71 reaches the position of the first disc supporting portion.

Figure 20:
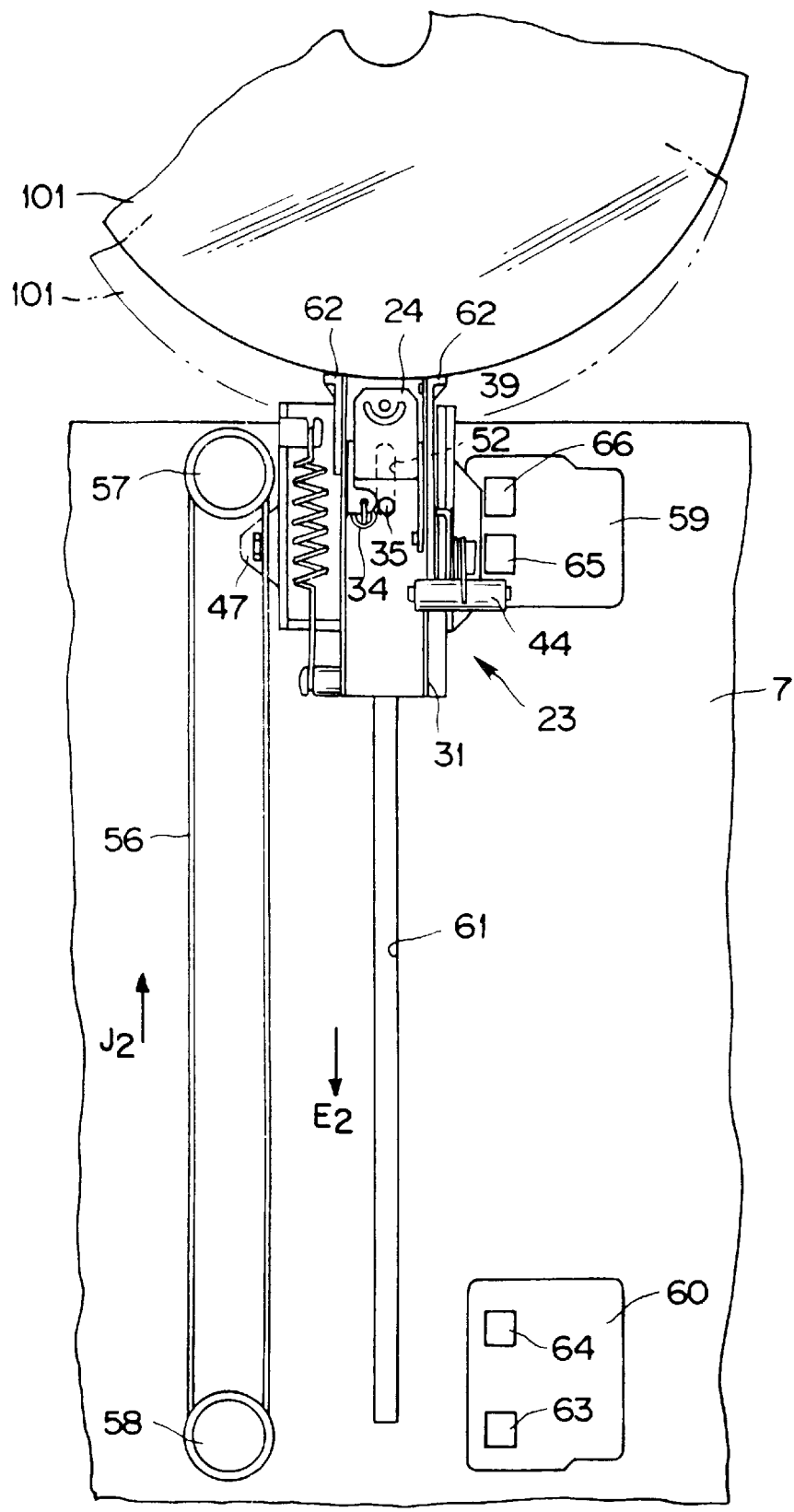
FIG. 20 is a plan view showing the state where the disc drawing mechanism is moved to third position where the disc grip mechanism grips or grasps the optical disc held within the disc accommodating body.
Figure 21:
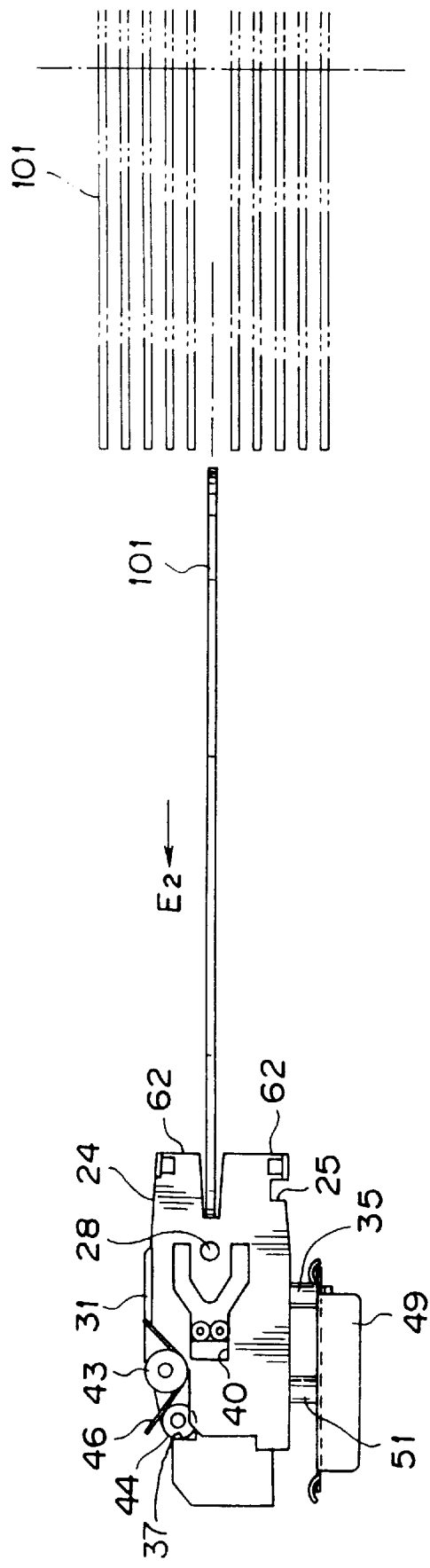
FIG. 21 is a side view showing the state where optical disc is drawn out from the disc accommodating body by the disc drawing mechanism.

Further, the controller 201 is operative so that when the vertical movement operation mechanism 71 reaches the position opposite to the first disc supporting portion 18, it delivers, to the movement operation mechanism 75, a control signal for advancing the above-described disc drawing mechanism 23 from the first position shown in FIG. 2 which is the initial position to the drawing position which is the third position shown in FIG. 20 where drawing operation of the optical disc 101 close to the disc accommodating body 2 is carried out. As a result, the disc drawing mechanism 23 is moved to the drawing position of the optical disc 101. Thus, the disc detection sensor 81 is brought into an OFF state when the optical disc 101 is held at the first disc supporting portion 18, and is brought into an ON state when the optical disc 101 is not held. The controller 201 judges presence of the optical disc 101 on the basis of a signal indicating that the optical disc 101 is present (e.g., High level corresponding to the OFF state), or is absent (Low level) delivered from the disc detection sensor 81. The judgment result is stored in the RAM 202 in correspondence with the first disc supporting portion 18. Moreover, at this time, the controller 201 delivers a control signal for withdrawing the disc drawing mechanism 23 to the first position to the movement operation mechanism 75. Thus, the disc drawing mechanism 23 is moved to the first position.

Then, the controller 201 repeats the above-described operation while delivering, to the step motor 211, a drive pulse for successively moving the vertical movement operation mechanism 71 to positions of the respective disc supporting portions 18 to judge whether or not the optical disc 101 is held at the respective disc supporting portions 18.

The judgment result is stored in the RAM 202 in correspondence with the respective disc supporting portions 18. When detections of presence of the optical disc 101 with respect to all disc supporting portions 18 are completed, the controller 201 sends, to the host computer, information indicating presence of the optical disc 101 stored in the RAM 202, and carries out, at this time, a control to return the vertical movement operation mechanism 71 to the home position. In addition, the controller 201 also carries out a control to display the detection result on the display section 203. Thus, user can recognize which disc supporting portion 18 accommodates the optical disc.

Namely, in this disc recording/reproduction unit, as the result of the fact that the disc detection sensor 81 is provided at the disc drawing mechanism 23, it is possible to detect presence of the optical disc 101 without drawing the optical disc 101 from the disc supporting portion 18. In addition, since the drawing operation is not carried out, it is possible to detect presence of the optical disc in a short time. In other words, in this disc recording/reproduction unit, an approach is employed, without drawing the optical disc 101, to move the vertical movement operation mechanism 71 to the disc supporting portion 18 to detect presence of the optical disc 101, thereby making it possible to detect, at a high speed, presence of the optical disc within the disc accommodating body 2.

Moreover, since the disc recording/reproduction unit according to this invention is adapted to move the disc drawing mechanism 23 in the direction of the disc accommodating body 2, thereby making it possible to carry out detection of presence of the optical disc 101, in the case where it is detected that the optical disc 101 is not located at the disc supporting portion 18, it is possible to immediately shift to the drawing operation to the next designated optical disc 101 held at the disc supporting portion 18 without carrying out the drawing operation of the optical disc 101. Thus, rapid exchange operation of the optical disc 101 can be realized.

Another example of a disc grip mechanism 174 will now be described. This disc grip mechanism 174 precisely carries out positioning of the grip position, thus making it possible to grip or grasp the optical disc 101, and to attain more reliable protection of the optical disc 101.

Figure 26:
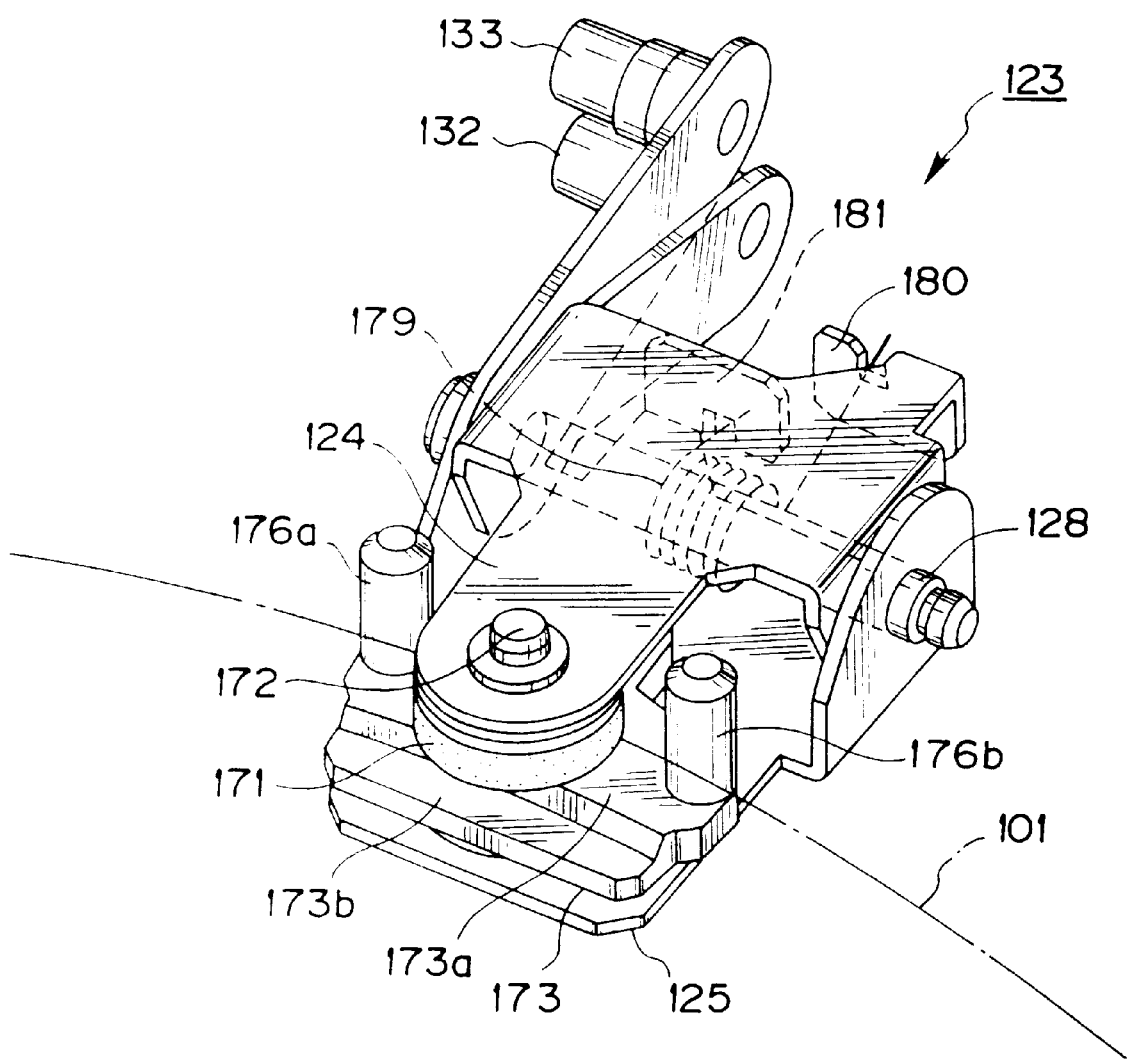
FIG. 26 is a perspective view showing another embodiment of disc grip mechanism constituting this invention.
Figure 27:
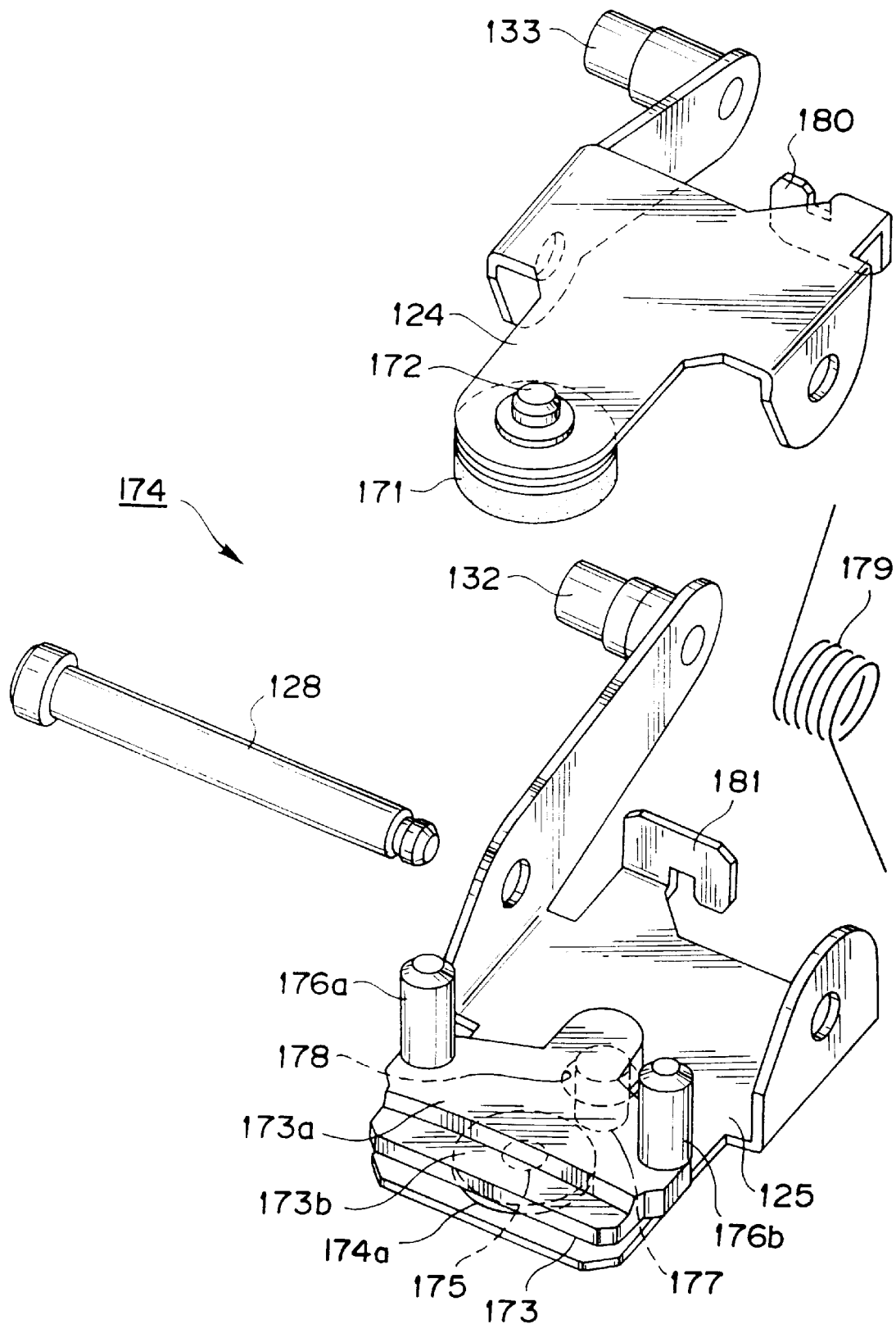
FIG. 27 is an exploded perspective view of the grip mechanism.
Figure 28:
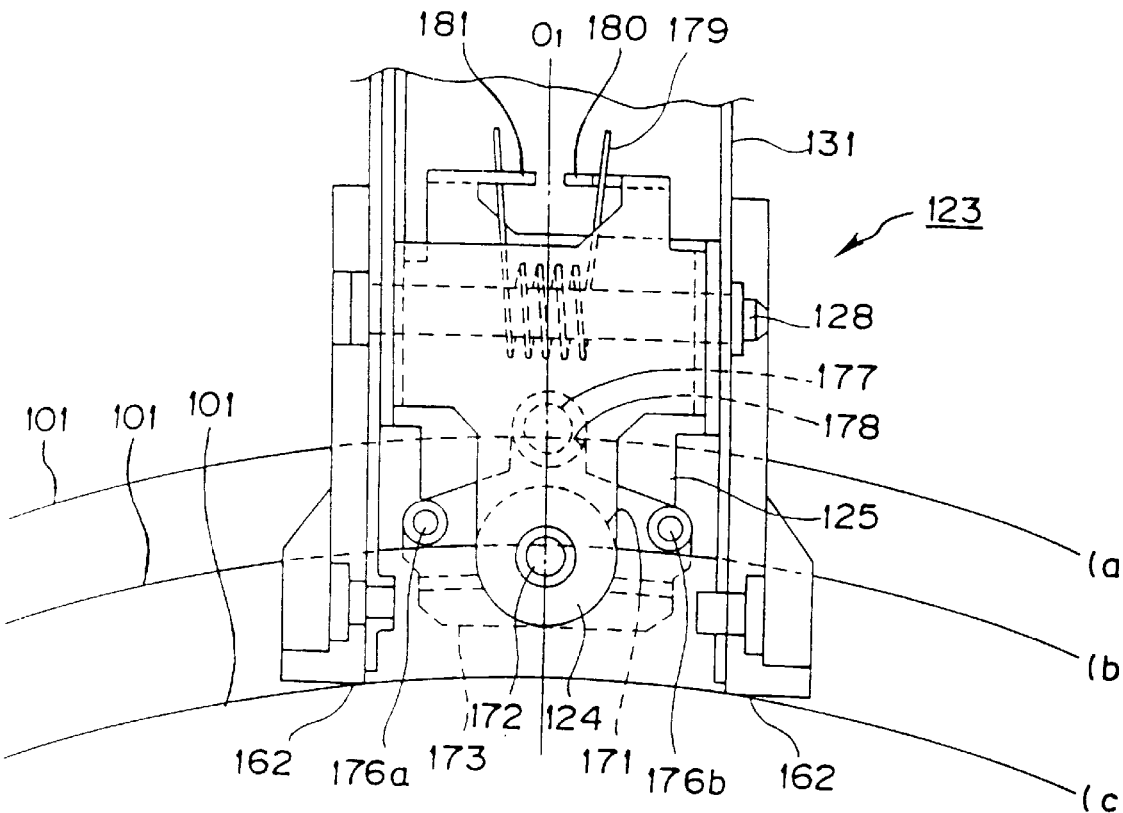
FIG. 28 is a clan view showing the state where optical disc held within the disc accommodating body is gripped or grasped by the grip mechanism.
Figure 29:
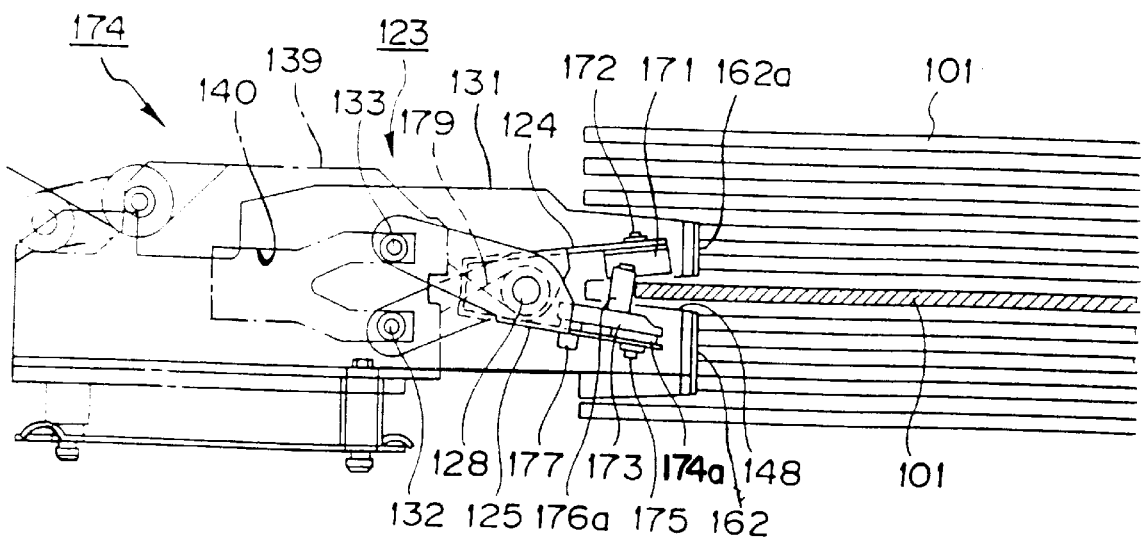
FIG. 29 is a side view showing the state where the optical disc held within the disc accommodating body is to be gripped or grasped by the grip mechanism assembled into the disc drawing mechanism.
Figure 30:
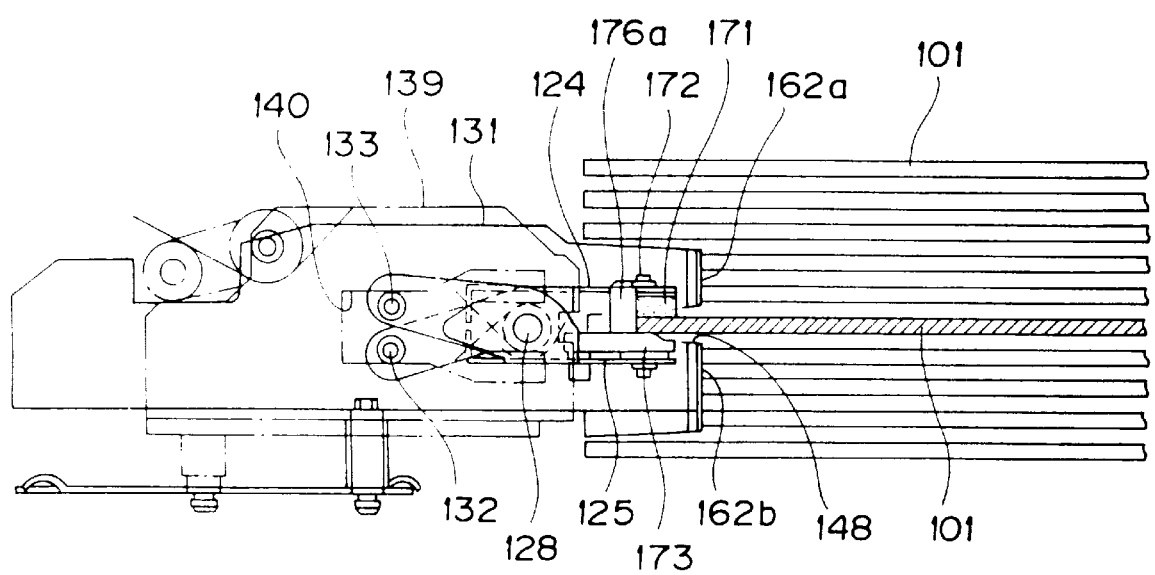
FIG. 30 is a side view showing the state where the optical disc held within the disc accommodating body is gripped or grasped by the grip mechanism assembled into the disc drawing mechanism.

This disc grip mechanism 174 comprises a pair of grip arms 124, 125 at the position where the optical disc 101 is gripped or grasped from upper and lower directions of the principal surface thereof similarly to the previously described grip mechanism. As shown in FIGS. 26 and 27, these pair of grip arms 124, 125 are supported at their central portions by a support shaft 128, and are rotatably supported with the support shaft 128 acting as the center between the pair of grip arms 124, 125. As shown in FIGS. 28 to 30, this disc grip mechanism 174 is rotatably attached to a grip mechanism supporting member 131 via the support shaft 128.

Further, at the respective front end portions of the pair of upper and lower grip arms 124, 125, there are provided members adapted to have ability to prevent that the optical disc 101 is damaged. Namely, at the front end portion of the grip arm 124 positioned at the upper side in FIGS. 26 and 27, there is attached a disc holding pad 171 for holding the label surface at the upper surface side of the optical disc 101. This disc holding pad 171 is formed by, e.g., cushion material having high friction coefficient such as silicon rubber, etc., and is rotatably attached, as shown in FIG. 28, via an attachment shaft 172 to the upper side grip arm 124 in a manner positioned on the central line $O_1$ passing through the center of the optical disc 101.

On the other hand, at the front end portion of the lower side grip arm 125, in a manner opposite to the disc holding pad 171, as shown in FIGS. 26 and 27, there is attached a disc holding plate 173 for holding the signal reading surface of the lower surface side of the optical disc. This disc holding plate 173 is rotatably attached via a spacer 174a and an attachment shaft 175 to the lower side grip arm 125 on the center line $O_1$, and is adapted so that a pair of centering projections 176a, 176b are provided at left and right symmetrical positions, respectively, with the center line $O_1$ being put therebetween at the disc holding surface 173a, whereby when the optical disc 101 is gripped or grasped, these centering projections 176a, 176b are in contact with the outer circumferential edge of the optical disc 101.

Moreover, while the disc holding plate 173 is adapted as shown in FIGS. 26 and 27 so that the portion up to the position corresponding to the outer circumferential side portion, where no signal is recorded on the signal reading surface of the optical disc 101, is caused to be the disc holding surface 173a of the same plane. The partial surface corresponding to the signal recording portion of the signal reading surface of the optical disc 101 is caused to be a step portion 173b depressed by one step. For this reason, when gripping or grasping the optical disc 101, the disc holding plate 173 holds the outer circumferential portion where no signal is recorded on the signal reading surface of the optical disc 101, e.g., the portion extending from the outer circumferential edge up to the portion inwardly positioned by about 1.5 mm in the case of optical disc 101 having diameter of 12 cm, and that is not in contact with the signal recording portion.

Further, at the rear (back) portion of the disc holding plate 173, a limiting pin 177 is provided as shown in FIG. 27. This limiting pin 177 is inserted into a hole portion 178 of a larger diameter formed at the grip arm 125 of the lower side. Thus, movement of the disc holding plate 173 is limited within the range where the limiting pin 177 is moved within this hole portion 178.

In this example, the disc holding plate 173 is formed by hard resin material for the purpose of ensuring the dimensional accuracy and a required rigidity.

Further, as shown in FIG. 26, a torsion coil spring 179 is fitted on the support shaft 128. This torsion coil spring 179 is fitted on the support shaft 128 in the state where the arm portion of one end side is held by a holding piece 180 provided at the upper side grip arm 124 and the arm portion of the other end side is held by a holding piece portion 181 provided at the lower side grip arm 125, whereby the pair of upper and lower grip arms 124, 125 are rotatably biased in a direction such that the disc holding pad 171 and the disc holding plate 173 are spaced from each other.

Further, at the other end portions of the pair of upper and lower grip arms 124, 125, engagement pins 133, 132 are respectively provided. As shown in FIG. 29, these engagement pins 133, 132 are inserted and engaged with a cam groove 140 provided at the movement member 139 constituting a disc drawing mechanism 123.

When the optical disc 101 is drawn out by the disc drawing mechanism 123 provided with the disc grip mechanism 174 of this embodiment constituted as described above, the grip mechanism supporting member 131 is moved toward the front side in the state where the disc holding pad 171 and the disc holding plate 173 of the upper and lower grip arms 124, 125 are spaced from each other as shown in FIG. 29, whereby the disc pressing portions 162a, 162b of the front end portion of the grip mechanism supporting member 131 press toward the inside of the disc accommodating body 2, and two optical discs positioned above and three optical discs 101 positioned below the optical disc 101 opposite to an engagement recessed portion 148 are moved from the position of (a) to the position of (c) shown in FIG. 28, resulting in the state where the outer circumferential edge portion side of the optical disc 101 opposite to the engagement recessed portion 148 is engaged into the engagement recessed portion 148. As a result, a pair of centering projections 176a, 176b of the disc holding plate 173 come into contact with the optical disc 101 to move the optical disc 101 toward the inside of the disc accommodating body 2 from the position of (a) up to the position of (b) shown in FIG. 28.

Since the optical disc 101 moved as the result of the fact that these pair of centering projections come into contact therewith is moved against biasing force of the disc supporting spring 20 provided at the disc accommodating body 2 side, a force resulting from pressure by the disc supporting spring 20 on the optical disc 101 is applied to the centering projections 176a, 176b. For this reason, the disc holding plate 173 attached to the lower side grip arm 125 in the rotatable state is caused to precisely undergo centering directed to the central direction of the optical disc 101 as the result of the fact that the outer circumferential edge of the circular optical disc 101 is received by the pair of left and right centering projections 176a, 176b. Further, when the movement member 139 is moved toward the front side directed to the inside of the disc accommodating body 2 as shown in FIG. 30 from the above-mentioned state, the engagement pins 132, 133 are moved along the cam groove 140 of the movement member 139, whereby the pair of upper and lower grip arms 124, 125 are rotated in the direction where the disc holding pad 171 and the disc holding plate 173 are caused to be close to each other, resulting in the state where the optical disc 101 is put between both upper and lower surface sides. In this state, the label surface of the upper surface side of the optical disc 101 is held by the disc holding pad 171 having high friction coefficient. Thus, the optical disc 101 is securely gripped or grasped by force produced by friction therebetween.

On the other hand, the signal reading surface of the lower surface side of the optical disc 101 is placed in the state where the disc holding plate 173 holds the outer circumferential side portion where no signal is recorded. In this instance, particularly in the disc grip mechanism 174 of this embodiment, since the disc holding plate 173 is caused to precisely undergo centering by the pair of centering projections 176a, 176b as previously described, it is possible to securely hold the outer circumferential side portion where no signal is recorded. Accordingly, there is no possibility that the signal recording portion of the optical disc 101 may suffer from any damage.

In a manner as described above, the grip mechanism supporting member 131 is moved toward the backward side where the grip mechanism supporting member 131 is spaced or away from the disc accommodating body 2 in the state where it grips or grasps the optical disc 101 without damaging the signal recording portion, and whereby the optical disc 101 is drawn out from the disc accommodating body 2. At this time, since the optical disc 101 is gripped or grasped by sufficiently large force by friction between the optical disc 101 and the disc holding pad 171, the optical disc 101 is securely drawn out from the disc accomodating body 2 without slipping off therefrom.

Moreover, in the case of sending the optical disc 101 back into the disc accommodating body 2, the optical disc 101 to be sent back is once pushed or thrust into the position of (b) shown in FIG. 28, but is pushed back (returned) up to a predetermined accommodating position (a) by force of the disc supporting spring 20.

Also in the case of this example, at the grip mechanism supporting member 131, there is provided a disc detection sensor for detecting presence of the optical disc 101 engaged with the engagement recessed portion 148.

It is to be noted that disc detection sensors used in the respective embodiments are not limited to the sensor of the optical system, but a sensor adapted to detect presence of engagement of the optical disc 101 into the engagement recessed portions 48, 148 by mechanical contact may be used.

In addition, the optical disc 101 accommodated within the disc accommodating body 2 is not limited to the optical disc of the recording/reproduction type, but may be the optical (disc of the reproduction only type. In this case, it is sufficient that a unit dedicated for reproduction is used as the recording and/or reproduction unit.

While explanation has been given in the above-described respective embodiments by taking the example of the disc recording/reproduction unit adapted so that optical discs 101 are accommodated within the disc accommodating body 2, this invention may be applied to disc recording and/or reproduction units using magnetic discs or other discs serving as a recording medium for information signals having rigidity to such a degree that deformation does not easily take place by pressing operation of the disc drawing mechanism, thus making it possible to obtain advantages similar to the above-described embodiments.

INDUSTRIAL APPLICABILITY

As described above, the disc recording and/or reproducing apparatus according to this invention is adapted to move at least another one disc adjacent to a predetermined one disc from plural discs accommodated within the disc holding body in such a manner that they are stacked toward the inside of the holding body against biasing force of the biasing member so as to grip or grasp, by the grip mechanism, only the predetermined one disc in a projected manner and to draw out it. Accordingly, it is possible to securely draw out a predetermined one disc from the disc holding body which has held plural discs therewithin. As a result, the interval or spacing between discs held within the disc holding body can be reduced. Thus, miniaturization of the apparatus itself can be realized.

What is claimed is:

1. A disc presence detecting method for a disc recording and/or reproducing apparatus comprising:

moving, to a position where a predetermined one disc accommodated at a disc accommodating portion of disc holding means is held, a drawing mechanism for moving, toward an inside area of said disc holding means, at least one disc adjacent to said predetermined one disc held by said disc holding means in which a plurality of disc accommodating portions adapted for accommodating a respective plurality of discs in such a manner that respective principal surfaces of said plurality of discs are opposite to each other and spacing said plurality of discs with a predetermined interval therebetween, and drawing out said predetermined one disc in a direction projected away from said disc accommodating portion of said disc holding means and holding said predetermined one disc;

thereafter detecting, by detecting means provided at said drawing mechanism and adapted for detecting presence of a disc from said plurality of discs within said disc holding means, whether said disc is accommodated at its respective said disc accommodating portion of said disc holding means; and thereafter moving said drawing mechanism to a second disc accommodating portion of said plurality of disc accommodating portions adjacent to said disc accommodating portion in which detection as to whether said disc was accommodated has been made, so as to carry out, by said detecting means, a detecting operation as to whether a second disc is accommodated at said second disc accommodating portion, and to repeatedly carry out said detecting operation with respect to each of said plurality of disc accommodating portions.

2. The disc presence detecting method for a disc recording and/or reproducing apparatus as set forth in claim 1, wherein a result detected by said detecting means is stored in correspondence with each of said plurality of disc accommodating portions of said disc holding means.

* * * * *